United States Patent
Hibayashi et al.

(10) Patent No.: US 9,223,170 B2
(45) Date of Patent: Dec. 29, 2015

(54) COLOR FILTER SUBSTRATE AND LIQUID CRYSTAL DISPLAY DEVICE

(71) Applicant: TOPPAN PRINTING CO., LTD., Tokyo (JP)

(72) Inventors: Yasuhiro Hibayashi, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 364 days.

(21) Appl. No.: 13/790,410

(22) Filed: Mar. 8, 2013

(65) Prior Publication Data
US 2013/0182205 A1 Jul. 18, 2013

Related U.S. Application Data

(63) Continuation of application No. PCT/JP2011/072168, filed on Sep. 28, 2011.

(30) Foreign Application Priority Data

Sep. 30, 2010 (JP) .................................. 2010-222813

(51) Int. Cl.
*G02F 1/1335* (2006.01)
*G02F 1/1337* (2006.01)
(Continued)

(52) U.S. Cl.
CPC .......... *G02F 1/133514* (2013.01); *G02B 5/201* (2013.01); *G02B 5/223* (2013.01);
(Continued)

(58) Field of Classification Search
CPC .................. G02F 1/133514; G02F 1/134363; G02F 1/133707; G02F 1/133512; G02F 2001/134372; G02F 2001/134381; G02B 5/223; G02B 5/201

USPC .................................................. 349/106, 110
See application file for complete search history.

(56) References Cited

U.S. PATENT DOCUMENTS 5,877,832 A * 3/1999 Shimada ....................... 349/138
7,079,206 B2 * 7/2006 Ha ................................ 349/114
(Continued)

FOREIGN PATENT DOCUMENTS

JP 62-262022 11/1987
JP 5-26161 2/1993
(Continued)

OTHER PUBLICATIONS

Takeda et al., Liquid Crystal Display Device, Machine Translation of JP 2009-186514 A from JPO AIPN website, All pages.*
(Continued)

*Primary Examiner* — Dennis Y Kim

(57) ABSTRACT

Disclosed a color filter substrate for a liquid crystal display device performing an ordinary display for a gray scale display and a dynamic display for a bright display, which includes a transparent substrate, a transparent conductive film formed above the transparent substrate, a black matrix formed above the transparent substrate and having pixel regions which are openings partitioned into polygonal pixel shapes respectively having two parallel sides, a first transparent resin layer formed so as to cover portions corresponding to the two parallel sides of the black matrix, a color layer formed above the pixel regions, and a second first transparent resin layer formed above the color layer and having a linear depression passing a center of the pixel region.

9 Claims, 15 Drawing Sheets

(51) Int. Cl.
*G02F 1/1343* (2006.01)
*G02B 5/20* (2006.01)
*G02B 5/22* (2006.01)

(52) U.S. Cl.
CPC .... *G02F1/133512* (2013.01); *G02F 1/133707* (2013.01); *G02F 1/134336* (2013.01); *G02F 1/134363* (2013.01); *G02F 2001/134372* (2013.01); *G02F 2001/134381* (2013.01)

(56) References Cited

U.S. PATENT DOCUMENTS

| | | | |
|---|---|---|---|
| 8,619,228 B2* | 12/2013 | Shimizu et al. | 349/141 |
| 2002/0047959 A1* | 4/2002 | Matsumoto et al. | 349/106 |
| 2006/0050209 A1 | 3/2006 | Higa | |
| 2007/0216832 A1 | 9/2007 | Takahashi et al. | |
| 2008/0002079 A1* | 1/2008 | Kimura | 349/42 |
| 2008/0151169 A1* | 6/2008 | Park et al. | 349/143 |
| 2010/0128208 A1* | 5/2010 | Kurasawa | 349/106 |

FOREIGN PATENT DOCUMENTS

| | | |
|---|---|---|
| JP | 2859093 | 2/1999 |
| JP | 2947350 | 7/1999 |
| JP | 2000-305100 | 11/2000 |
| JP | 2005-167243 | 6/2005 |
| JP | 2005-352451 | 12/2005 |
| JP | 2007-72149 | 3/2007 |
| JP | 2007-279674 | 10/2007 |
| JP | 2009186514 A * | 8/2009 |
| JP | 2010-9064 | 1/2010 |
| JP | 4460849 | 2/2010 |
| JP | 4459338 | 4/2010 |
| WO | WO 2009/069362 A1 | 6/2009 |

OTHER PUBLICATIONS

International Preliminary Report on Patentability mailed Apr. 18, 2013 for corresponding International Application No. PCT/JP2011/072168.

Extended European Search Report issued Jul. 9, 2013 in corresponding European Application No. 11829173.1.

International Search Report of Corresponding PCT Application PCT/JP2011/072168 mailed Oct. 25, 2011.

* cited by examiner

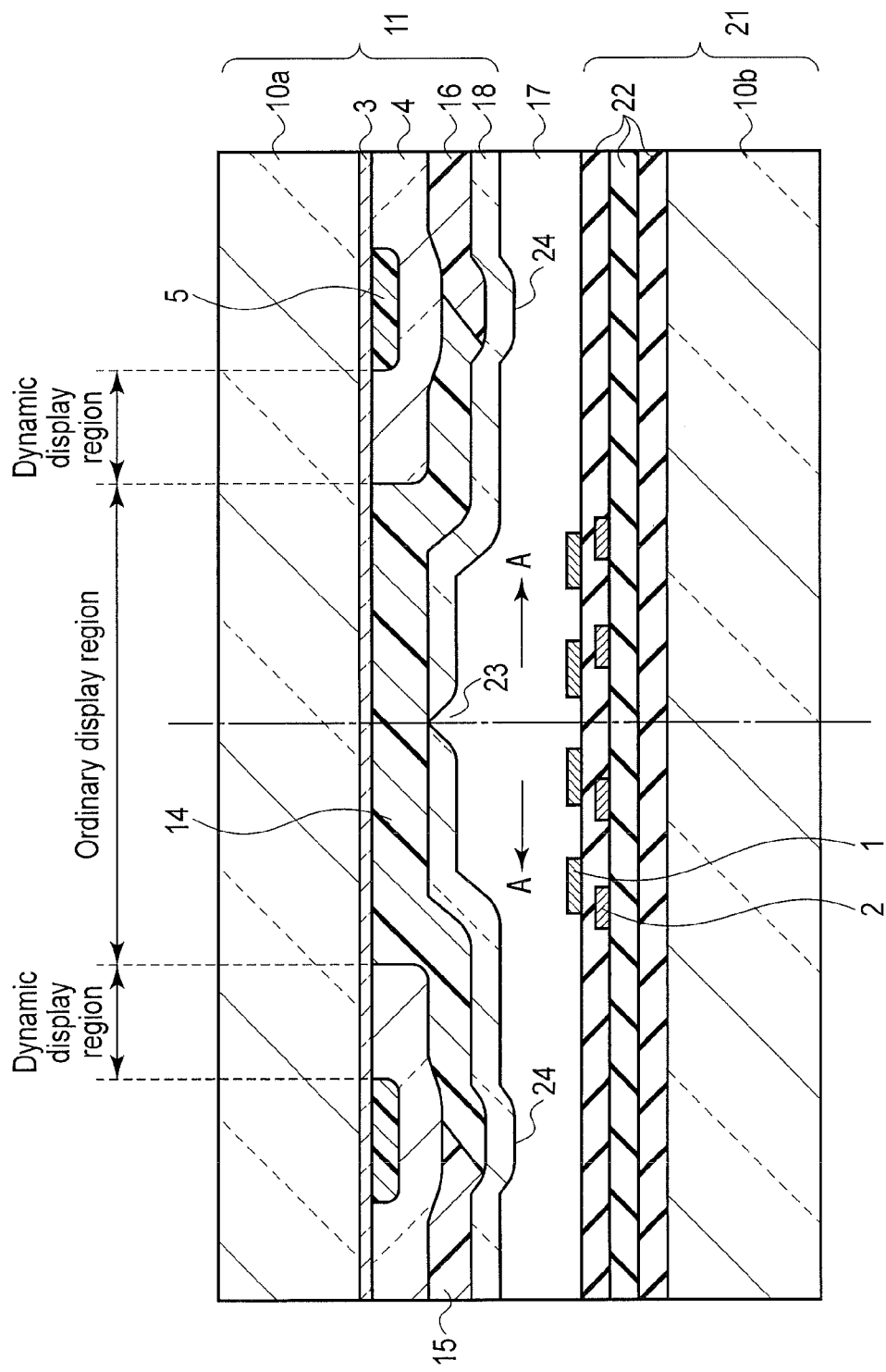
F I G. 1

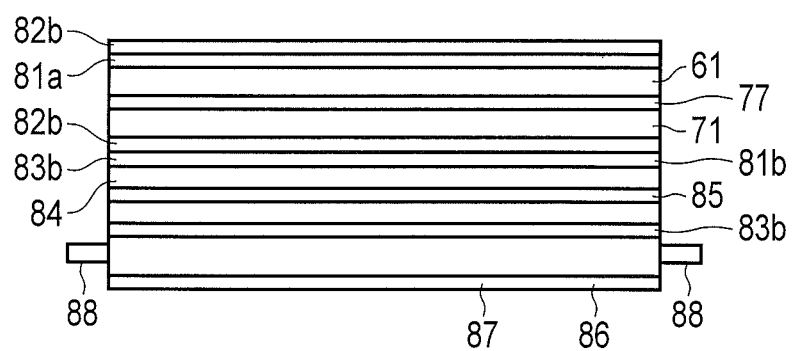
F I G. 12

COLOR FILTER SUBSTRATE AND LIQUID CRYSTAL DISPLAY DEVICE

CROSS REFERENCE TO RELATED APPLICATIONS

This application is a Continuation Application of PCT Application No. PCT/JP2011/072168, filed Sep. 28, 2011 and based upon and claiming the benefit of priority from prior Japanese Patent Application No. 2010-222813, filed Sep. 30, 2010, the entire contents of all of which are incorporated herein by reference.

BACKGROUND OF THE INVENTION

1. Field of the Invention

The present invention relates to a color filter substrate and to a liquid crystal display device provided with the color filter substrate. In particular, the present invention relates to a color filter substrate suitable for driving liquid crystal by means of oblique electric field caused by applying voltage between a transparent conductive film formed for the color filter substrate and first and second electrodes formed for an array substrate, and a liquid crystal display device provided with the color filter substrate.

2. Description of the Related Art

In recent years, thin display devices such as a liquid crystal display device are increasingly demanded to enhance the picture quality and power-saving thereof and to reduce the manufacturing cost thereof. In the case of the color filter to be employed in such display devices, it is demanded to exhibit sufficient color purity, high contrast, and flatness in order to obtain high image quality.

In liquid crystal display device having high image quality, various alignment systems and driving systems of liquid crystal are proposed. Liquid crystal cells employing these systems includes VA (Vertically Aligned), HAN (Hybrid Aligned Nematic), TN (Twisted Nematic), OCB (Optically Compensated Bend), and CPA (Continuous Pinwheel Alighnment). Display device of a wide viewing angle and high speed response are realized by these liquid crystal cells.

In liquid crystal display devices of VA system which is easily applicable to high speed response in a wide viewing angle and in which liquid crystal molecules are aligned vertical to a surface of a substrate made of glass, and of HAN system which is effective in wide viewing angle, it is demanded to obtain further high level flatness in regard to color filter (uniformity of film thickness and evenness of the surface of color filter) and electric properties such as dielectric constant. In such liquid crystal display devices having high image quality, it is a problem to decrease a film thickness of liquid crystal cell (liquid crystal layer) in order to suppress coloring of image in oblique viewing direction. In the liquid crystal display devices of VA system, various improved modes have been developed in order to solve such problem, the modes including multi-domain vertically alignment (MVA) mode, patterned vertically alignment (PVA) mode, vertically alignment electrically controlled birefringence (VAECB) mode, vertically alignment hybrid-aligned nematic (VAHAN) mode, and vertically alignment twisted nematic (VATN) mode. In the liquid crystal display devices of vertical electric field system such as VA system in which driving voltage is applied in thickness direction of liquid crystal layer, it is demanded to obtain higher response of liquid crystal, wider viewing angle, and higher permeability. MVA is a technique to attain wide viewing angle. In this technique, a plurality of structures named as ribs or slits for restricting alignment of liquid crystal molecules arranged, and domains of liquid crystal in a plurality of alignment directions are formed between the ribs in order to solve the problem of unstable vertical alignment of liquid crystal molecules on application of voltage for driving liquid crystal (a tilt direction of liquid crystal molecules on application of voltage, which are vertically aligned at initial stage, is undeterminate). JP-A 2005-167243 disclosed a technique of forming domains of liquid crystal using first and second structures for restricting alignment (ribs).

When liquid crystal of negative dielectric anisotropy is employed, liquid crystal molecules between ribs made of resin tilts in a direction perpendicular to the ribs as viewed from the front on application of voltage, and are aligned parallel to the surface of the substrate. In this case, tilt direction of liquid crystal molecules positioned at a center of a region between the ribs is indeterminate irrespective of application of voltage, and these liquid crystal molecules act in spraying alignment or bending alignment. These alignment turbulence bring about rough or uneven display. In the case of MVA system, it is difficult to minutely control the tilt amount of liquid crystal molecules by driving voltage. For that reason, a half gray scale display has a difficult point.

In order to solve the problem, the technique of controlling vertical aligned liquid crystal molecules by means of oblique electric field caused by applying voltage between a transparent electrode on the color filter substrate side (transparent electrode or third electrode) and first and second electrodes on the array substrate side is disclosed in Japanese Patent Nos. 2859093 and 4459338. The technique disclosed in Japanese Patent No. 2859093 employs liquid crystal of negative dielectric anisotropy, and the technique disclosed in Japanese Patent No. 4459338 employs liquid crystal of positive dielectric anisotropy.

The technique of controlling vertical aligned liquid crystal molecules by means of oblique electric field caused by applying voltage between a transparent electrode and first and second electrodes as described in Japanese Patent Nos. 2859093 and 4459338 is very effective. It is possible to set a tilt direction of liquid crystal molecules by oblique electric field. Since a tilt amount of liquid crystal molecules can be easily control, it is effective in a halfgray scale display.

Even these techniques are, however, insufficient in preventive measures against disclination of liquid crystal. "Disclination" is a phenomenon in which regions having different transmittances are generated in a pixel (minimum unit in display) by undesirous alignment disorder.

In the technique disclosed in Japanese Patent No. 2859093, an alignment controlling window in which a transparent conductive film is not formed is arranged in the center of the portion of the opposing electrode corresponding to a pixel in order to fix the disclination in the center of the pixel. The document, however, dose not disclose the preventive measures against disclination around the pixel. Though the document discloses the fixing of the disclination in the center of the pixel, does not disclose the measures for minimizing the disclination and improving the response property of liquid crystal.

The technique disclosed in Japanese Patent No. 4459338 is a preferable technique since a dielectric layer formed on a transparent conductive film (transparent electrode) promotes effects of oblique electric field. The technique disclosed in Japanese Patent No. 4459338, however, has a problem of lowering of transmittance or aperture ratio since vertically aligned liquid crystal molecules are remained in the center of the pixel and around the pixel even after application of voltage as shown in FIG. 7 of Japanese Patent No. 4459338.

Where liquid crystal of a positive dielectric anisotropy is employed (Japanese Patent No. 4459338 does not disclose liquid crystal of a negative dielectric anisotropy in the description and Examples.), it is difficult to raise transmittance owing to disclination in the center of the pixel. For that reason, it is difficult to employ the technique disclosed in Japanese Patent No. 4459338 in transflective liquid crystal display devices.

Generally, liquid crystal display devices of VA system or TN system have a fundamental structure in which liquid crystal is sandwiched between a color filter substrate having a common electrode and an array substrate having a plurality of pixel electrodes for driving liquid crystal (for example, transparent electrodes having a combteeth shaped pattern and connected to TFT elements). In this structure, liquid crystal is driven by applying voltage between the common electrode on the color filter substrate and the pixel electrode formed on the array substrate side. The pixel electrode and the common electrode are formed of a conductive metal thin film made of indium tin oxide (ITO), indium zinc oxide (IZO), or indium gallium zinc oxide (IGZO).

Color filter structure, in which blue, green, and red pixels are formed above a transparent conductive film, is disclosed in FIG. 2 of JP-A 5-26161. The technique of forming a color filter on a transparent electrode (transparent conductive film) is disclosed in the above-described Japanese Patent No. 4459338 (for example, in FIGS. 7 and 9), though it employs a plurality of stripe electrodes and liquid crystal of a positive dielectric anisotropy.

As a technique of improving a brightness and luminosity in order to obtain a dynamic display of a higher picture quality and to extend a range of chromaticity, a technique performing four-color display in which a yellow pixel or white pixel is added to a red pixel, green pixel, and blue pixel.

These techniques, however, necessitate another pixel such as a yellow pixel and white pixel together with a red pixel, green pixel, and blue pixel, and a further active element for driving the other pixel or color filter layer for forming a color filter, and thus bring about high cost owing to increase in number of manufacturing steps. Further, these techniques necessitate suppression or inactivation of yellow or white display in the gradation display range in which yellow or white display having high brightness is not necessary, and do not bring about effective rise of brightness. Furthermore, these techniques necessitate control of color temperature of a backlight and adjustment of pixel areas of different colors for obtaining a white balance. In addition, there is a problem that yellowish tone is strengthened in a reflective display. For example, a special blue filter shown in Jpn. Pat. Appln. KOKAI Publication No. 2005-352451 is necessary to suppress the yellowish tone.

BRIEF SUMMARY OF THE INVENTION

Problem to be Solved by the Invention

The present invention has been accomplished in view of the aforementioned circumstances and hence objects of the present invention are to provide a color filter substrate which has an improved gray scale display together with an improved response property, and enables a high brightness display, and to provide a liquid crystal display device which is equipped with such a color filter substrate.

Solution to the Problems

According to a first aspect of the present invention, there is provided a color filter substrate for a liquid crystal display device performing an ordinary display for a gray scale display and a dynamic display for a bright display, which comprises a transparent substrate; a transparent conductive film formed above the transparent substrate; a black matrix formed above the transparent conductive film and having a pixel region which is an opening partitioned into a polygonal pixel shape having two parallel sides; a first transparent resin layer formed so as to cover portions corresponding to the two lateral sides of the black matrix; a color layer formed for the pixel region; and a second first transparent resin layer formed above the color layer and having a linear depression passing a center of the pixel region.

According to a second aspect of the present invention, there is provided a liquid crystal display device which is equipped with the above described color filter substrate.

According to a third aspect of the present invention, there is provided a liquid crystal display device which comprises a color filter substrate including a transparent substrate, a transparent conductive film formed above the transparent substrate, a black matrix formed on the transparent substrate and having pixel regions which are openings partitioned into polygonal pixel shapes respectively having two parallel sides, a first transparent resin layer, and color pixels formed of a plurality of color layers formed above the pixel regions; an array substrate arranged to oppose to the color filter substrate and provided with elements for driving liquid crystal, the elements being arranged in a matrix form; and a liquid crystal layer interposed between the color filter substrate and the array substrate, wherein the first transparent resin layer and color layer overlap along the black matrix in the pixel region, the array substrate includes a first electrode and a second electrode, which are of combteeth shape, made of conductive metal oxide, and are transparent in visible light range, the second electrode are arranged beneath the first electrode with an insulating layer interposed therebetween, and the second electrode protrudes from an edge of the first electrode toward the first transparent resin layer in a plane view.

BRIEF DESCRIPTION OF THE SEVERAL VIEWS OF THE DRAWING

FIG. 1 is a cross-sectional view schematically illustrating a liquid crystal display device according to one embodiment of the present invention;

FIG. 12 is a sectional view illustrating a part of a liquid crystal display device according to Example 4;

DETAILED DESCRIPTION OF THE INVENTION

Figure 2:
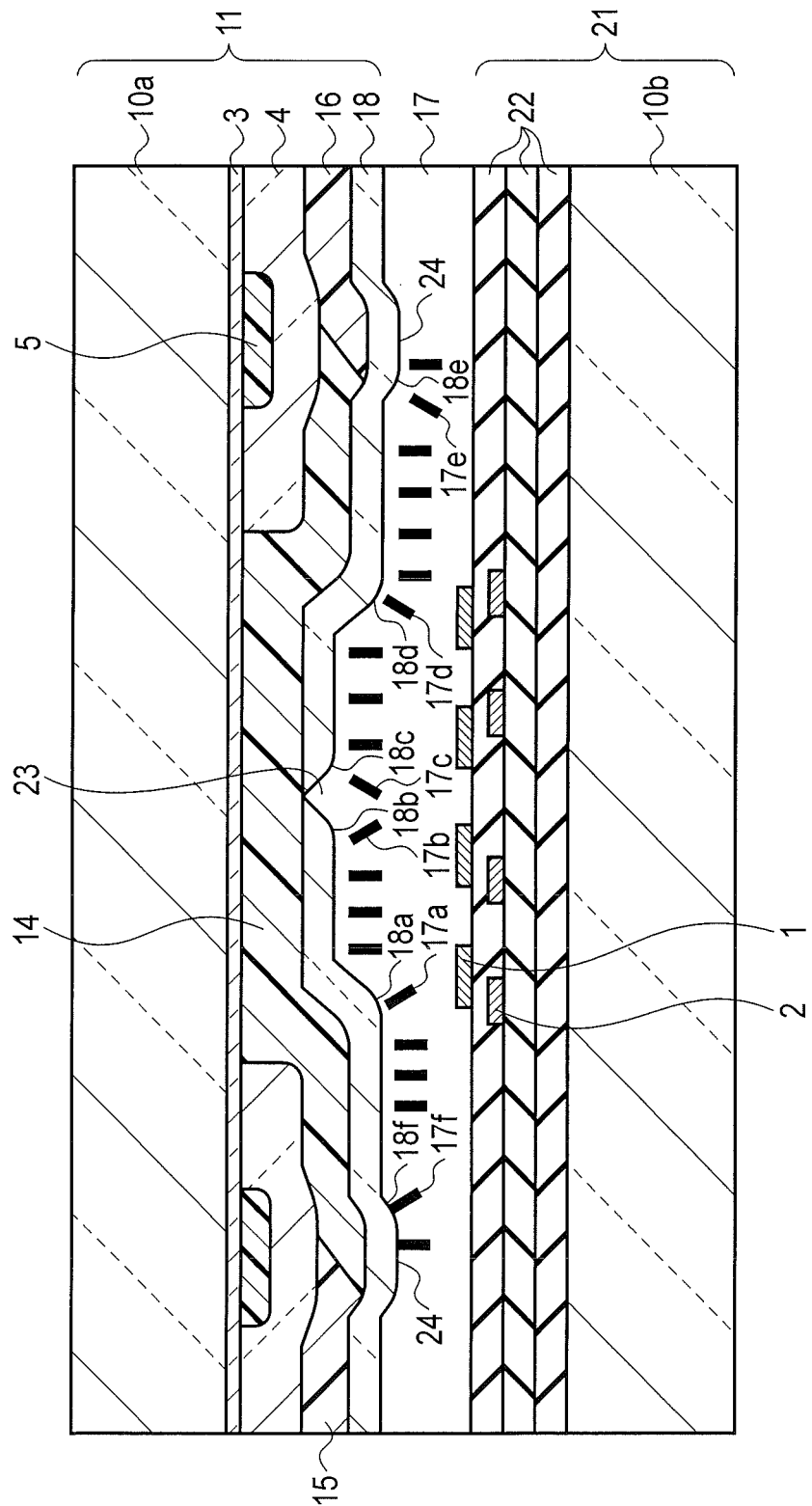
FIG. 2 is a cross-sectional view illustrating an initial alignment state of vertically aligned liquid crystal molecules on a green pixel of the liquid crystal display device shown in FIG. 1.

A color filter substrate according to a first aspect of the present invention is a color filter substrate for a liquid crystal display device performing an ordinary display for a gray scale display and a dynamic display for a bright display, and comprises a transparent substrate, a transparent conductive film formed above the transparent substrate, a black matrix formed above the transparent conductive film and having a pixel region which is an opening partitioned into a polygonal pixel shape having two parallel sides, a first transparent resin layer formed so as to cover portions corresponding to the two parallel sides of the black matrix, a color layer formed for the pixel region, and a second transparent resin layer formed above the color layer and having a linear depression passing a center of the pixel region.

In the color filter substrate described above, the color layer may be partitioned into a ordinary display region formed directly above the transparent conductive film at the center of the pixel region, and a dynamic display region formed above the first transparent resin layer formed so as to cover portions corresponding to the two parallel sides of the black matrix.

A thickness A of the first transparent resin layer between the surface of the transparent conductive film formed above the transparent substrate and a bottom of the linear depression, a total thickness B of the color layer and the second transparent resin layer in the ordinary display region, and a total thickness C of the first transparent resin layer, the color layer and the second transparent resin layer in the dynamic display region may satisfy a relationship of A<B<C.

Further, a total thickness from the black matrix to the second transparent resin layer above the black matrix may be larger than the thickness C in the dynamic display region.

A liquid crystal display device according to a second aspect of the present invention includes the color filter substrate described above.

The liquid crystal display device described above may include the color filter substrate, an array substrate arranged to oppose to the color filter substrate and provided with elements for driving liquid crystal, said elements being arranged in a matrix form, and a liquid crystal layer interposed between the color filter substrate and the array substrate. The array substrate may include a first electrode and a second electrode to which different voltages are applied in order to drive liquid crystal.

Liquid crystal molecules in two regions formed by symmetrically dividing the pixel region with a straight line may act to tilt to opposite directions to each other when an operating voltage is applied between the first electrode and the second and third electrodes, the third electrode being the transparent.

The pixel region may be point-symmetrically divided into four operating regions with regard to a center of the pixel region in a plane view when the liquid crystal molecules act depending on a driving voltage applied thereto.

The first electrode may have a combteeth shaped pattern and connected to active elements driving liquid crystal, the second electrode may have a combteeth shaped pattern and arranged beneath the first electrode with an insulating layer interposed therebetween, and the second electrode protrudes from an edge of the first electrode toward a side of a pixel in a plane view.

The first and second electrodes may be made of conductive metal oxide that is transparent in a visible light range.

A liquid crystal display device according to a third aspect of the present invention which comprises a color filter substrate including a transparent substrate, a transparent conductive film formed above the transparent substrate, a black matrix formed on the transparent substrate and having a pixel regions which are openings partitioned into polygonal pixel shapes respectively having two parallel sides, a first transparent resin layer, and color pixels formed of a plurality of color layers formed above the pixel regions, an array substrate arranged to oppose to the color filter substrate and provided with elements for driving liquid crystal, said elements being arranged in a matrix form, and a liquid crystal layer interposed between the color filter substrate and the array substrate, wherein the first transparent resin layer and color layer overlap along the black matrix in the pixel region, the array substrate includes a first electrode and a second electrode, which are of combteeth shape, made of conductive metal oxide, and are transparent in visible light range, the second electrode are arranged beneath the first electrode with an insulating layer interposed therebetween, and the second electrode protrudes from an edge of the first electrode toward the first transparent resin layer in a plane view.

The first electrode may not be arranged in that a position above the array substrate in which the first transparent resin layer is arranged in the plane view.

The liquid crystal having a negative dielectric anisotropy may be employed.

According to aspects of the present invention described above, there is provided a color filter substrate which has an improved gray scale display together with an improved response property, and enables a high brightness display, and a liquid crystal display device which is equipped with such a color filter substrate. In particular, according to aspects of the present invention, there is provided a color filter substrate which enables vibrant display by strengthening luminosity without upsetting color balance and increasing number of TFT elements, and a liquid crystal display device which is equipped with such a color filter substrate.

Further, according to aspects of the present invention, there is provided a liquid crystal display device that enables reflective type display of well-balanced color without exhibiting yellowish tone.

Furthermore, according to aspects of the present invention, there is provided a liquid crystal display device which can display a bright image without increase in number of pixels such as a white pixel or yellow pixel, so that it enables bright display in comparison with prior devices by canceling disclination, which lowers transmittance factor of liquid crystal, without a dead pixel such as a white pixel at ordinary gray scale display.

There will be described various embodiments of the present invention as follows.

Figure 8A:
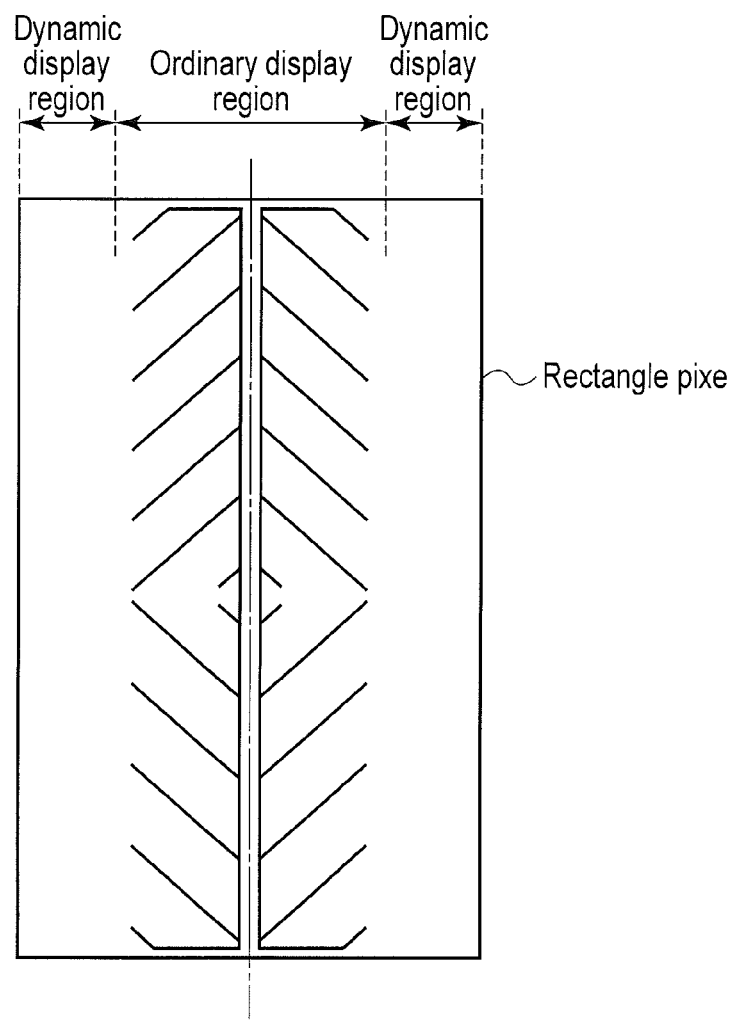
FIG. 8A is a plan view illustrating the pattern of the first electrode for dividing into four motion directions of liquid crystal molecules.
Figure 8B:
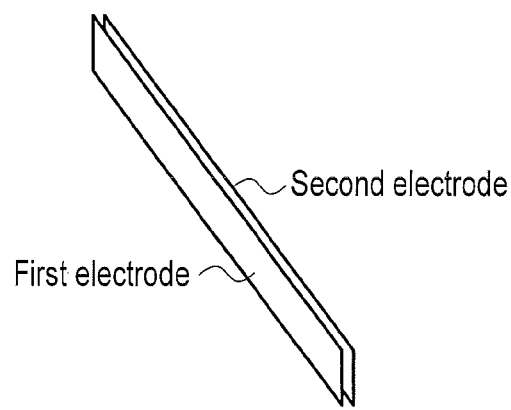
FIG. 8B is a view illustrating the first and second electrodes.

The target of one embodiment of the present invention is a liquid crystal display device of a normally black display type. The premise of one embodiment of the present invention is a liquid crystal display device including a color filter substrate, an array substrate provided with driving elements such as TFT and opposed to the color filter substrate, and a liquid crystal layer interposed between the color filter substrate and array substrate which are bonded to each other. The technique of the embodiment can be applied to the liquid crystal display device employing liquid crystal which orientates in parallel with the substrate at an initial stage and perpendicularly with the substrate on application of driving voltage. In addition, the present embodiment utilizes an oblique electric field generated in the electrode arrangement including first and second electrodes formed on the side of the array substrate, on which different voltages are applied, and a transparent electrode acting as a third electrode and formed on the color filter substrate. The first electrode may have a combteeth shaped pattern, and the longitudinal direction of the pattern may be in parallel with the first transparent layer. Where one pixel is divided into four alignment direction, the pattern may be an oblique combteeth shaped pattern so that the four alignment direction has point symmetry in regard to the center of the pixel as shown in FIGS. 8A and 8B. FIG. 8A shows the arrangement of the combteeth shaped electrode, and FIG. 8B is the enlarged view of the combteeth shaped electrode. As shown in FIG. 8B, the second electrode protrudes from an edge of the first electrode in the direction of the first transparent layer.

The present inventors have found that the symmetric inclination of liquid crystal molecules in regard to the center of the pixel can be generated by utilizing alignment of the liquid crystal molecules at the step formed in the color filter symmetrically in regard to the center of the pixel. In addition, the present inventors have found that, by utilizing the oblique electric field described above, there is provided liquid crystal display devices which show rapid response of liquid crystal and high transmittance factor due to no disclination.

It is necessary to form the step in the color filter or color pixel symmetrically and in one direction in regard to the center of the pixel. That is to say, it is necessary to form the step having a thick portion or thin portion in one direction so that the inclination direction of liquid crystal molecules are symmetric about the center of the pixel. The step portion is formed to utilize the alignment of liquid crystal in the shoulder portion for the inclination of liquid crystal. Incidentally, the operation of liquid crystal will be explained in Examples described below. Difference in height at the step ranges preferably between 0.5 µm and 2 µm. When the difference in height is less than 0.5 µm, sufficient effect as a trigger for the inclination of liquid crystal may no be obtained. When the difference in height is more than 2 µm, liquid crystal may not flow smoothly in the manufacturing process of liquid crystal cells. The step can be easily formed by forming the black matrix or first transparent resin layer before coating of the color layer.

The linear depression of the first resin layer can be formed linearly and in parallel with a side of a polygonal pixel shape having two lateral sides. Alternatively, it can be formed in the shape of a cross as viewed from above. Though it is not necessary to limit the method of forming the linear depression, a optical method using a photomask (photolithography) is preferably employed due to its simplicity. The combteeth shaped pattern of the first electrode can be arranged in parallel with the linear depression.

In order to form the step enabling the alignment of liquid crystal described above, it is desirable that thickness A of the first transparent resin layer between the surface of the transparent conductive film formed on the transparent substrate and the bottom of the linear depression of the first resin layer, total thickness B of the color layer and the second transparent resin layer in the ordinary display region, and total thickness C of the first transparent resin layer, the color layer and the second transparent resin layer in the dynamic display region satisfy an inequality of $A<B<C$.

Further, it is desirable that the total thickness between the surface of the black matrix and the surface of the second transparent resin layer is larger than thickness C in the dynamic display region.

Incidentally, "ordinary display" in the present invention means a gray scale display in which a well-known color filter having a color layer containing organic pigment dispersed therein is applied to a liquid crystal display device. On the other hand, in dynamic display, a color layer having a thickness smaller than that of the color layer in the ordinary display is employed. Thus, in dynamic display, a color layer having a transmittance factor higher than that of the color layer in the ordinary display is formed. In dynamic display, for example, it is an additional condition to display by applying driving voltage higher than that in ordinary display to liquid crystal. In other word, the dynamic display can be performed when it is necessary to obtain more bright display effect than that in the ordinary display, or to supplement brightness under a bright atmosphere out of doors.

There will now be explained in brief technical terms used in the specification.

"Black matrix" is a light-shielding pattern arranged around a picture cell or on the both side of a picture cell, which is a minimum unit of display, in order to increase a contrast of display. "Light-shielding layer" is a light-shielding coating containing a transparent resin and light-shielding pigment dispersed in the transparent resin, and has a photo-sensitivity. The light-shielding layer is patterned by means of photolithography including light-exposure and development.

Figure 14:
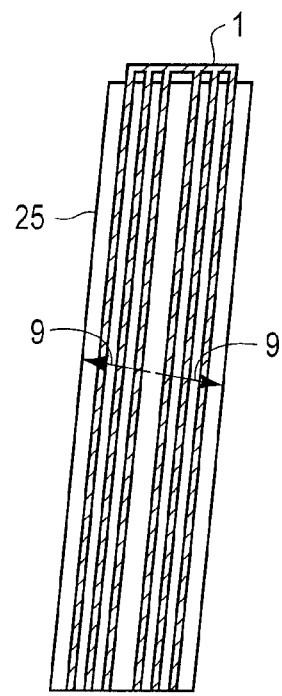
FIG. 14 is a plan view illustrating a pattern of a first electrode having an aperture of parallelogram shape.
Figure 15:
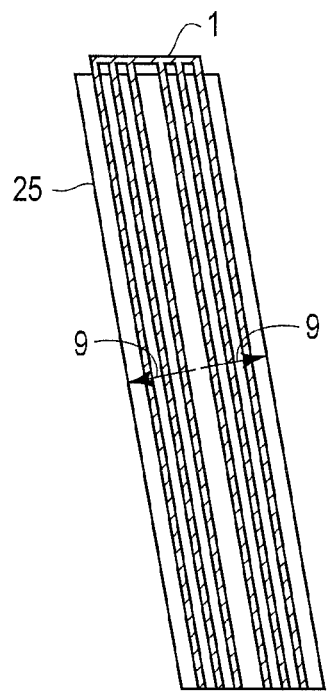
FIG. 15 is a plan view illustrating a pattern of a first electrode having an aperture of parallelogram shape.
Figure 16:
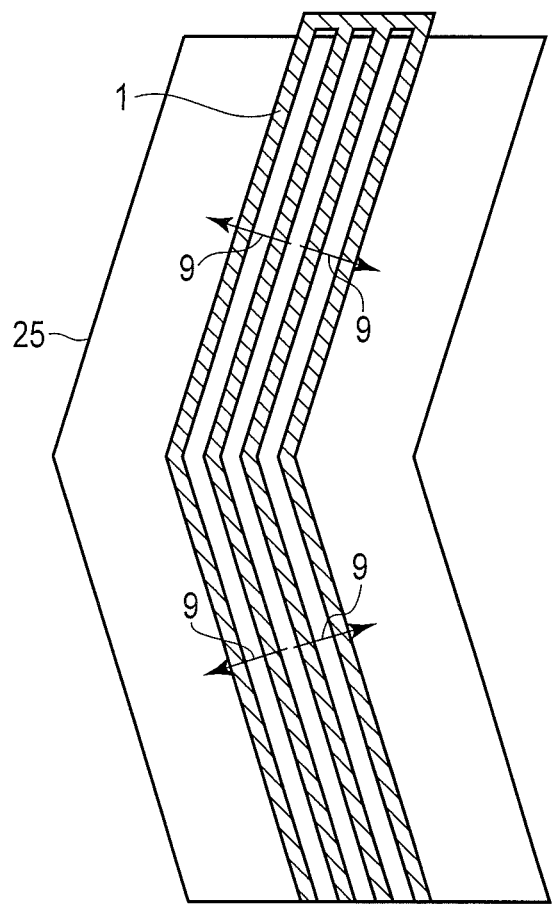
FIG. 16 is a plan view illustrating a pattern of a first electrode applicable to one embodiment of the present invention.

"Pixel" is formed in an opening of the black matrix and is the same term with picture element. In general, the pixel has a polygonal shape with two opposed lateral sides. The polygon with two opposed lateral sides includes, for example, a quadrilateral such as rectangle, a parallelogram as shown in FIGS. 14 and 15, a hexagon, a polygon having a bend in the center of the pixel as shown in FIG. 16.

"Color layer" is formed in the pixel by patterning a coating containing a transparent resin and organic pigment dispersed in the transparent resin by means of photolithography. The portion of the color layer positioned on the linear resin layer and the overlap portion on the black matrix are also called color layer.

In the present embodiment, it is possible to employ both liquid crystal of negative dielectric anisotropy and liquid crystal of positive dielectric anisotropy. For example, it is possible to employ nematic liquid crystal having a birefringence of about 0.1 at a room temperature as liquid crystal of negative dielectric anisotropy. Since liquid crystal of positive dielectric anisotropy can be selected within a wide range, various liquid crystals can be employed as liquid crystal of positive dielectric anisotropy. Though it is not necessary to limit the thickness of the liquid crystal layer, And of the liquid crystal layer, which can be effectively used in the present embodiment, ranges between about 300 nm and 500 nm. Furthermore, the present invention employs liquid crystal molecules which orientate in parallel with a substrate. In the case of the liquid crystal molecules which orientate in parallel with a substrate at the initial stage, the liquid crystal molecules start to rise vertically with the substrate and thus light permeate through the liquid crystal layer. Where the liquid crystal orientating in parallel with a substrate is employed, it is necessary to rubbing-treat an alignment film in order to unitarily set the alignment direction of the liquid crystal molecules. On the other hand, where the liquid crystal orientating vertically with a substrate is employed, rubbing treatment can be omitted. From this viewpoint, the liquid crystal orientating vertically with a substrate can be preferably employed.

It is possible to employ liquid crystal having a fluorine atom in a molecular structure (called fluorine based liquid crystal hereinafter). Since a high electric field is generated in the protruded portion of the first and second electrodes when a driving voltage is applied therebetween, it is possible to employ liquid crystal having a dielectric constant lower than that of the liquid crystal employed in the prior vertical alignment system (liquid crystal having a small dielectric anisotropy), such as fluorine based liquid crystal. In general, liquid crystal having a small dielectric anisotropy has a low viscosity and brings about a high-speed response on applying electric field of the same strength. Further, since fluorine based liquid crystal has a low dielectric constant, it draws only small amount of ionic impurities. For that reason, such liquid crystal does not bring about deterioration of performance such as drop of voltage keeping factor due to ionic impurities, and has a merit that irregular display is hardly caused.

In the liquid crystal display device of the present embodiment, conductive metal oxide such as ITO described above can be employed as a material of the first and second electrode on the array substrate side. Alternatively, metal having conductivity higher than that of metal oxide can be employed. Further, in the case of the reflective or transflective type liquid crystal display device, it is possible to use a thin film made of aluminum or aluminum alloy as either one of the first electrode and second electrode. As shown in FIG. 1, the fist electrode 1, second electrode 2, and metal wiring of active elements are formed through a insulating layer 22 made of silicon nitride (SiNx) or silicon oxide (SiOx). In FIG. 1, TFT and metal wiring connected to TFT are omitted. Incidentally, The technique of forming a gate wiring and source wiring by a single layer made of aluminum alloy having a low contact resistance with ITO of conductive metal oxide is disclosed in JP A-2009-105424.

It is possible to increase aperture ratio of a pixel by forming a thin film of TFT, which is an active element, by for example, oxide semiconductor. Such oxide semiconductor includes complex metal oxide of Indium, gallium, and zinc (IGZO).

In the present embodiment, though relative dielectric constant of the color layer is a relatively important property, it is unitarily determined depending on a ratio of amount of organic pigment to be added as a colorant to amount of transparent resin. For that reason, it is difficult to alter greatly relative dielectric constant. In other word, species and content of the organic pigment are set in consideration of color purity necessary for the liquid crystal display device, whereby relative dielectric constant of the color layer is almost determined. Incidentally, it is possible to obtain the color layer having relative dielectric constant of 5.0 or more by increasing the content of the organic pigment in the color layer and thinning the color layer. Further, it is possible to elevate the relative dielectric constant of the color layer in some degree by employing high refractive index material as a transparent resin. The relative dielectric constant of the color layer containing organic a pigment ranges between about 2.9 and 4.5.

The thickness of the color layer or transparent resin layer may be optimized in relation to a cell gap of the liquid crystal display device (thickness of the liquid crystal layer). From the viewpoint of necessary electric property, it is possible to thicken the liquid crystal layer when the color layer or transparent resin layer becomes thin. When the color layer or transparent resin layer becomes thick, it is possible to thin accordingly the liquid crystal layer. Incidentally, the transparent resin layer is the same member with a protective layer made of acrylic resin, etc. in Examples described later.

In the present invention, the liquid crystal display device is applied to dynamic display, and area ratio between the ordinary display region and dynamic display region in one pixel is adjusted, thereby providing the liquid crystal display device of low electricity consumption. By controlling the dielectric constant and thickness of the color layer and transparent resin layer, it is possible to make a difference in driving voltage of ordinary display and dynamic display. The driving of liquid crystal by means of oblique electric field in the present invention has a large effect on the dynamic display.

It is not necessary to limit the thickness of the color layer in the dynamic display region. When the thickness of color layer in the dynamic display region is one-third to one-fourth of that in the ordinary display region, coloring can be sufficiently recognized.

In the liquid crystal display device of initial vertical (perpendicularity) alignment type or initial horizontal alignment type, when driving voltage is applied in order to display intermediate tone image, yellowish image may appear. In the present embodiment, this undesirable coloring can be reduced by finely adjusting the thickness of the color layer formed on the first transparent resin layer. In order to reduce appearance of the yellowish image, transmittance factor of the blue pixel may be raised. A simple method for realizing the raising of transmittance factor of the blue pixel is to increase the width or height of the first transparent resin layer formed in the blue pixel, thereby to increase relatively the amount of blue transmitted light. In reverse, it may be possible to decrease the width or height of the first transparent resin layer formed in the red pixel and green pixel. Where the width or height of the first transparent resin layer is adjusted to alter the area of the dynamic display region, the transmittance factor of the color layer can be adjusted to control color balance. The color balance can be controlled also by adding a small amount of colorant to the first transparent resin layer.

Where a retardation layer is incorporated in the color filter substrate of the present embodiment, the retardation layer can be formed of a polymerizable liquid crystal compound having retardation and containing a curing agent such as a photosensitive polymerization initiator and photosensitizer. The first transparent resin layer or a part of the first transparent resin layer can be formed of the retardation layer.

There will be described the functions of the transparent conductive film as a third electrode, linear depression of a second transparent resin layer, and step formed by laminate of the first transparent resin layer color layer as follows.

FIG. 1 is a model view showing a liquid crystal display device according to one embodiment of the present invention. This liquid crystal display device includes a color filter substrate for liquid crystal display device (abbreviated to color filter substrate hereinafter) 11 and an array substrate 21 which are bonded to the each other with liquid crystal 17 interposed therebetween. The color filter substrate 11 includes a third electrode 3 of transparent conductive film, a black matrix 5, a first transparent resin layer 4, a green pixel 14, a red pixel 15, a blue pixel 16, and a second transparent resin layer 18 which are formed on a transparent substrate 10a, respectively. The second transparent resin layer 18 has a linear depression 23 passing a center of a pixel region partitioned by the black matrix 5.

The array substrate 21 is constructed such that a first electrode 1 and a second electrode 2 are formed on a transparent substrate 10b with an insulating layer 22 interposed therebetween. In FIG. 1, an alignment layer, polarizer, and retardation plate are omitted. The omitted alignment layer may be formed of a polyimide based organic polymer film that is cured by heating. One to three retardation plates laminated on the polarizer may be used.

FIG. 2 is a sectional view showing an alignment state of vertical-aligned liquid crystal 17. Incidentally, the polarizer is arranged in crossed Nicols, thereby to provide a normally black type liquid crystal display device. FIG. 2 shows an alignment state of liquid crystal molecules 17a, 17b, 17c, and 17d of the vertical-aligned liquid crystal 17.

Almost liquid crystal molecules are aligned vertically with the surface of the green pixel 14 in the ordinary display region and dynamic display region. However, the liquid crystal molecules 17b and 17c near the shoulder potion 18b and 18c of the linear depression 23, and the liquid crystal molecules 17a, 17b, 17c, 17d, 17e and 17f near the shoulder potion 18a, 18b, 18c, 18d, 18e and 18f are somewhat obliquely aligned at initial stage.

Figure 3:
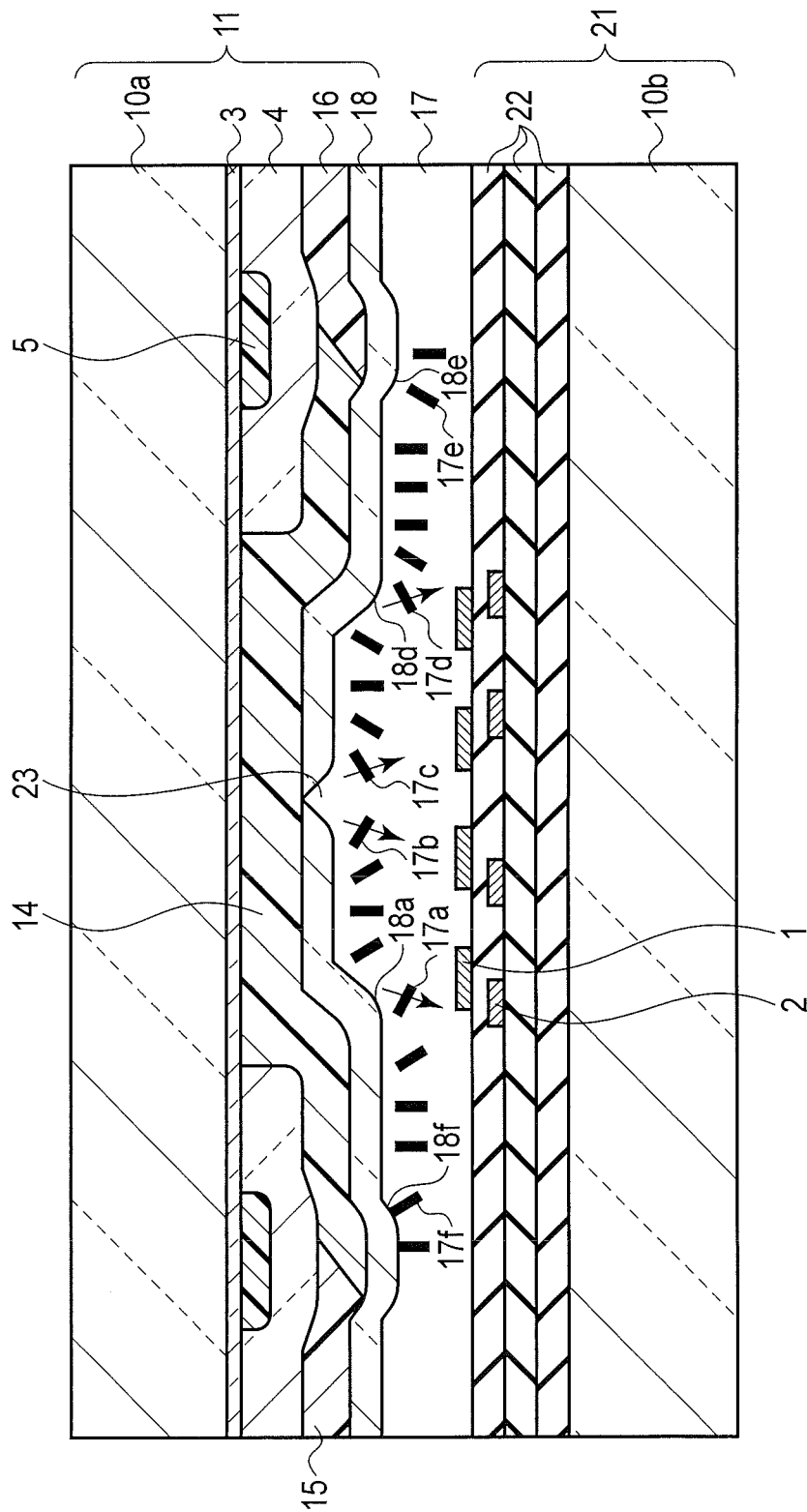
FIG. 3 is a view explaining a motion of liquid crystal molecules which begin to tilt immediately after application of driving voltage in the liquid crystal display device shown in FIG. 1.
Figure 4:
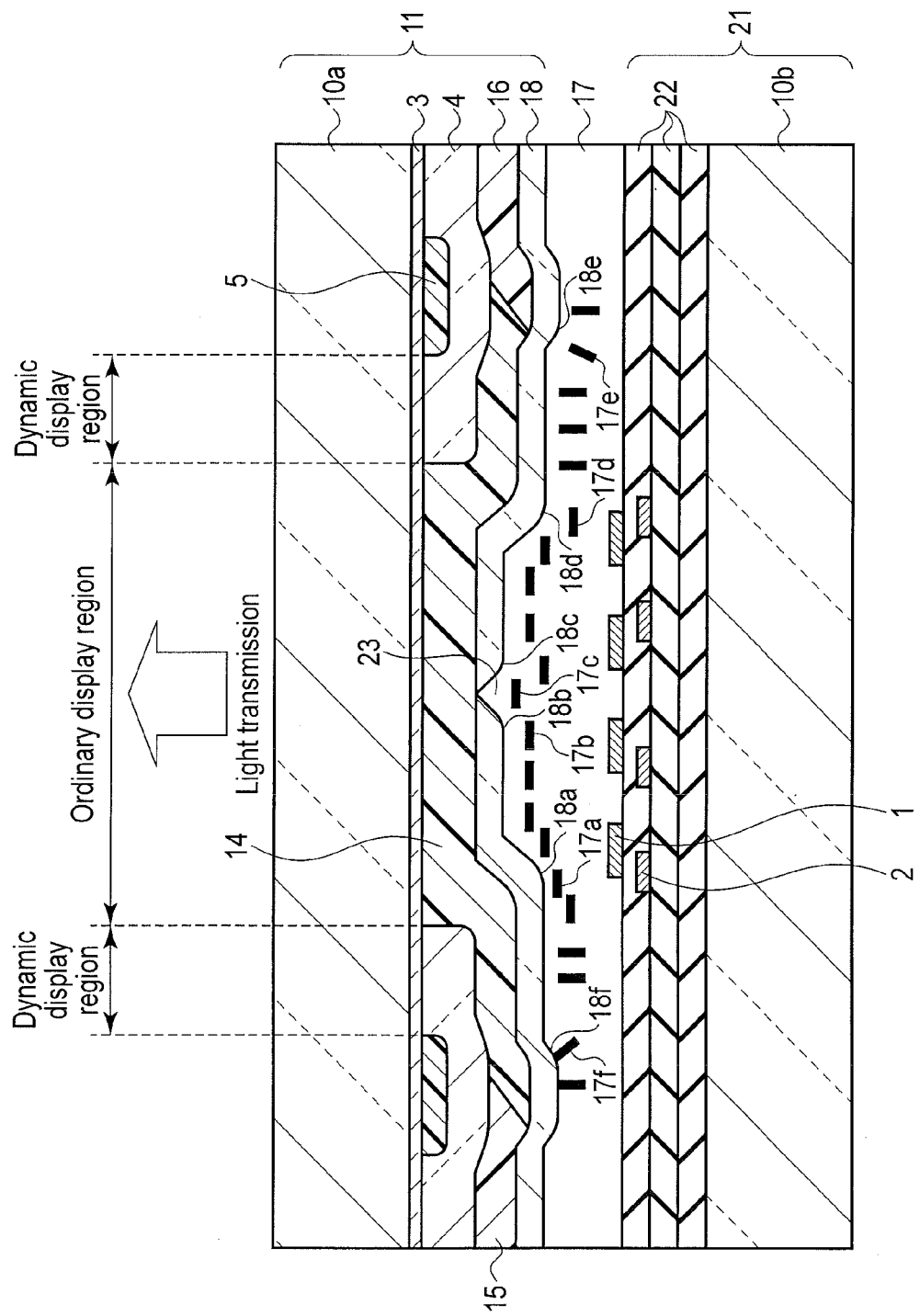
FIG. 4 is a view illustrating an alignment state of liquid crystal molecules in white display (green color display in the figure) after application of driving voltage in the liquid crystal display device shown in FIG. 1.

When a driving voltage is applied to the electrodes in a state in which the liquid crystal molecules 17a, 17b, 17c, and 17d are obliquely inclined, the liquid crystal molecules 17a, 17b, 17c, and 17d tilts in the direction of the arrow as shown in FIG. 3. Since the liquid crystal molecules near the linear depression 23 of the second transparent resin layer 18 is near the third electrode 3 of a transparent conductive film due to the presence of the linear depression 23, voltage is easily applied, and those liquid crystal molecules start to incline immediately after application of voltage. This inclination of the liquid crystal molecules trigger the inclination of the neighboring liquid crystal molecules, and the liquid crystal molecules incline in the direction of the center of the pixel on which the first transparent resin layer is formed, as shown in FIG. 4, whereby light transmits to cause green display. Since the liquid crystal molecules 17a, 17b are obliquely inclined at initial stage, they are apt to incline in the direction of the arrow on application of driving voltage. That is, the ordinary display region shown in FIG. 4 causes green display in the ordinary gray scale display.

FIG. 4 is a view showing an alignment state of the liquid crystal molecules in white display (since FIG. 4 shows the green pixel, display color is green) after driving voltage is applied. As shown in FIG. 4, the liquid crystal molecules in the ordinary display region are inclined nearly in parallel with the surface of the substrate. The liquid crystal molecules in the dynamic display region remain aligned vertically with the surface of the substrate in green display in the ordinary gray scale display (in FIG. 4, ordinary display region), or do not sufficiently tilt. The dynamic display region including the first transparent resin layer, therefore, cause black or dark display. Incidentally, even if an alignment treatment such as rubbing is not performed, the liquid crystal molecules 17a, 17b, 17c, and 17d near the shoulder portions 18a, 18b, 18c, and 18d of the linear depression 23 and the convex portion tilt virtually.

A light-shielding layer may be arranged on the shoulder portions of the linear depression, convex portion and transparent resin layer in advance. The light-shielding layer may be formed in the same forming step with that of the black matrix. Alternatively, a metal wiring on the array substrate side may be used as the light-shielding layer.

Incidentally, inclination directions of the liquid crystal molecules are reverse in the half opposite side (right side) of the green pixel 14. This means that it is possible to optical-compensate symmetrically in the pixel in the intermediate tone display, and to secure a wide viewing angle without forming four domains like an MVA liquid crystal device. In the intermediate tone (the state in which the liquid crystal molecules are obliquely inclined), the liquid crystal molecules in a half part of the pixel and in another half part of the pixel are obliquely inclined in the opposite direction. These half parts of the pixel are optically leveled to extend a viewing angle.

Figure 5:
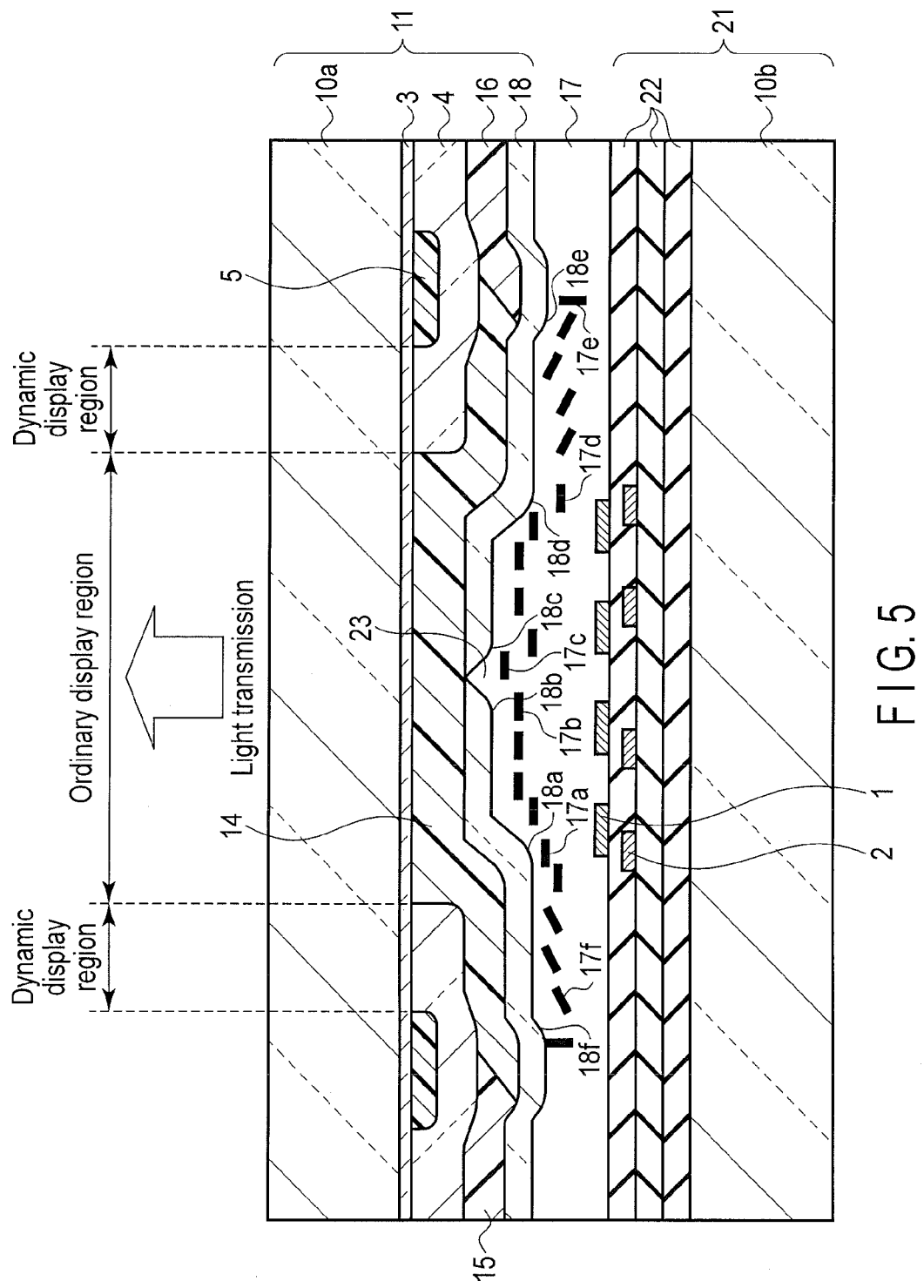
FIG. 5 is a view illustrating an alignment state of liquid crystal molecules in high brightness display after application of higher driving voltage in the liquid crystal display device shown in FIG. 1.

FIG. 5 is a view showing alignment of liquid crystal on application of higher driving voltage. That is, the liquid crystal molecules in the dynamic display region are inclined vertically with line of electric force (in parallel with the substrate 10b) with application of high voltage. According to the alignment of liquid crystal molecules, light transmits the liquid crystal layer in the dynamic display region. The color layer having a high transmittance factor is formed on the first transparent resin layer 4 in the dynamic display region, and therefore, a bright green image is displayed in the dynamic display region. Incidentally, since the transparent resin layer 4 and the color layer 14, 15, 16 are thickly formed on the third electrode in the first in the dynamic display region, it is necessary to apply voltage higher than that in the ordinary display region.

The driving voltage applied to the first and second electrodes may be shifted in order to ease image persistence. Where one pixel is driven by two or more active elements, timing of driving voltage and waveform of applying voltage to one active element may be controlled.

The behavior of the liquid crystal molecules near the color filter substrate is described above. In the liquid crystal display device according to another embodiment of the present invention, the liquid crystal molecules on the array substrate side also inclines in the same direction with that on the color filter substrate side. Those examples using liquid crystal having negative dielectric anisotropy is explained as follows.

Figure 6:
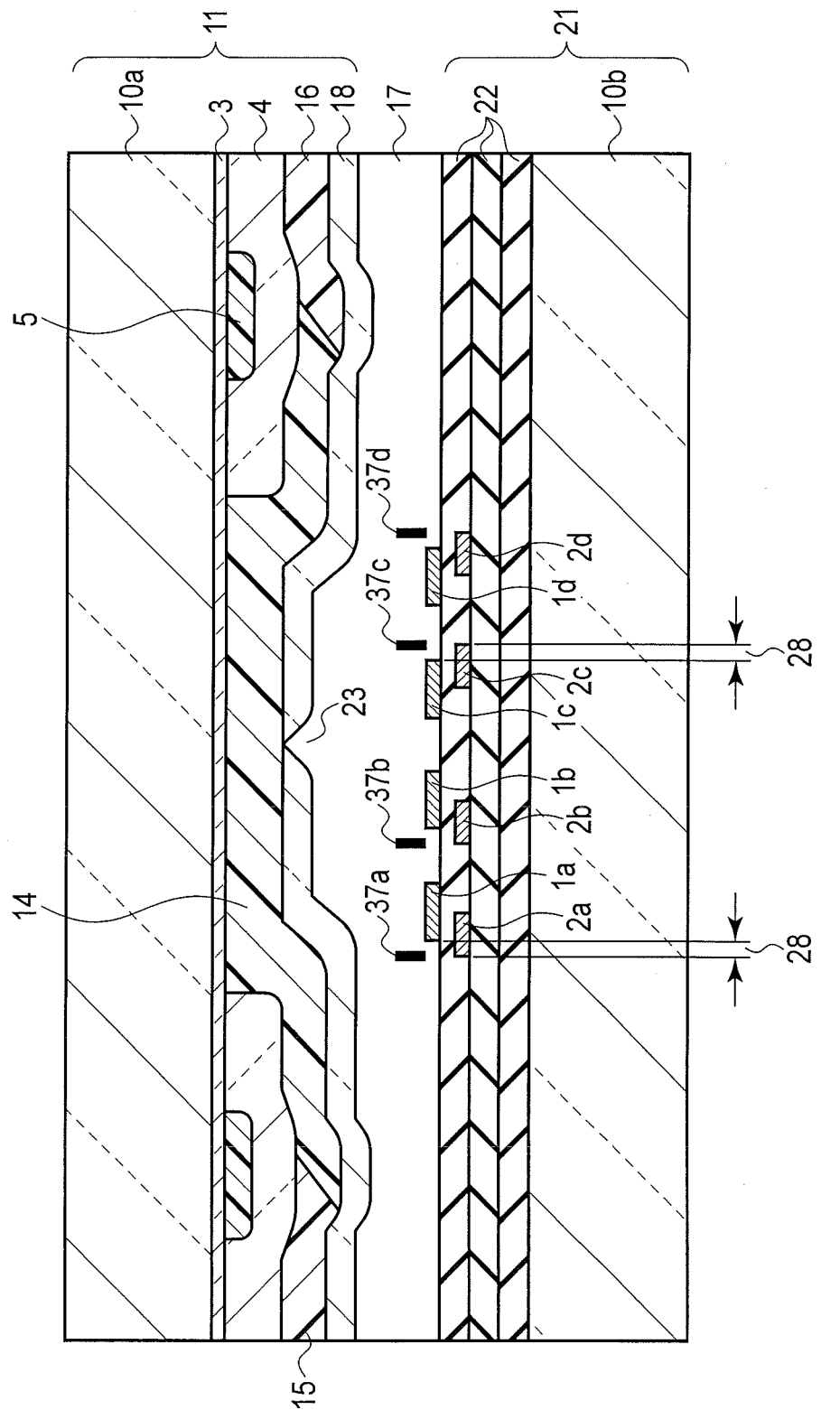
FIG. 6 is a view illustrating vertically aligned liquid crystal molecules near a first electrode of the liquid crystal display device shown in FIG. 1 in which the first and second electrodes have combteeth shaped pattern.

In the liquid crystal display device shown in FIG. 6, the first electrode is constituted by combteeth shaped electrode 1a, 1b, 1c, 1d, and the second electrode is constituted by combteeth shaped electrode 2a, 2b, 2c, 2d. The liquid crystal molecules 37a, 37b, 37c, 37d near the first electrode 1a, 1b, 1c, 1d are aligned vertically with the substrate when no voltage is applied.

In the liquid crystal display device shown in FIG. 6, the second electrode 2a, 2b, 2c, 2d is protrudes from an edge of the first electrode 1a, 1b, 1c, 1d in order to tilt the liquid crystal molecules 37a in the direction of the protrusion in the center of the pixel during application of the driving voltage. Length 28 of the projection can be controlled by adjusting kind of liquid crystal material, driving voltage, thickness of liquid crystal cell, etc. Small width of 1 to 5 μm suffices for width 28 of the projection. Overlapping width of the first electrode 1a, 1b, 1c, 1d and second electrode 2a, 2b, 2c, 2d is denoted by 29. Alignment film is omitted in the figures. If necessary, the overlapped portion can be used as an auxiliary capacitor.

Figure 7:
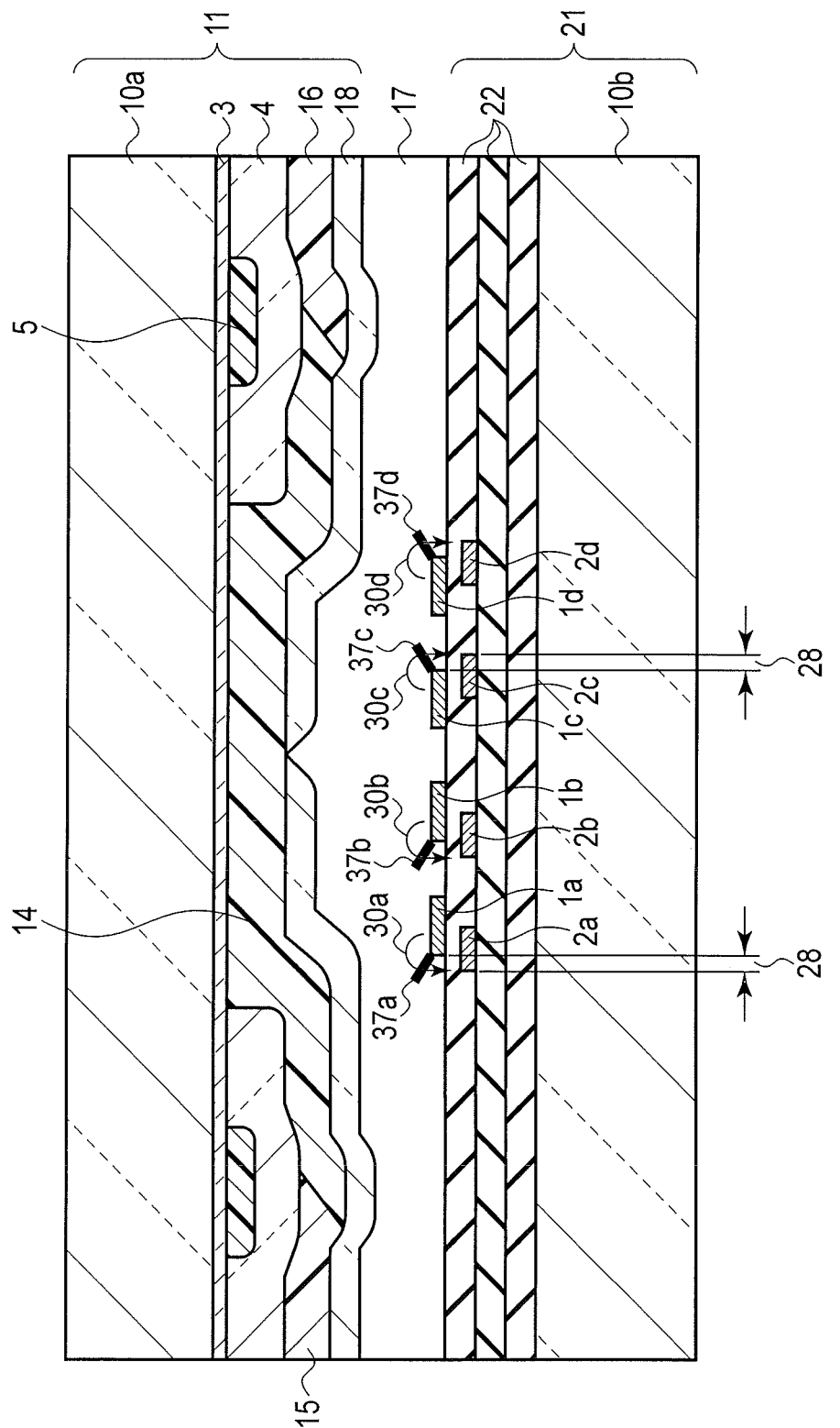
FIG. 7 is a view illustrating motions of liquid crystal molecules and electric lines of force immediately after application of driving voltage in the liquid crystal display device shown in FIG. 6.

FIG. 7 shows motions of the liquid crystal molecules 37a, 37b, 37c, 37d, and the lines 30a, 30b, 30c, 30d of electric force, immediately after applying of driving voltage on liquid crystal molecules. The liquid crystal molecules 37a, 37b, 37c, 37d are inclined in the direction of the lines of electric force when voltage is applied. Since the tilting direction of those liquid crystal molecules are the same as that of the liquid crystal molecules 17a, 17b, 17c, 17d shown in FIG. 3, the liquid crystal molecules in the green pixel 14 shown in the figure instantaneously tilt in the same direction, and thus greatly improving a response property of liquid crystal.

Figure 9:
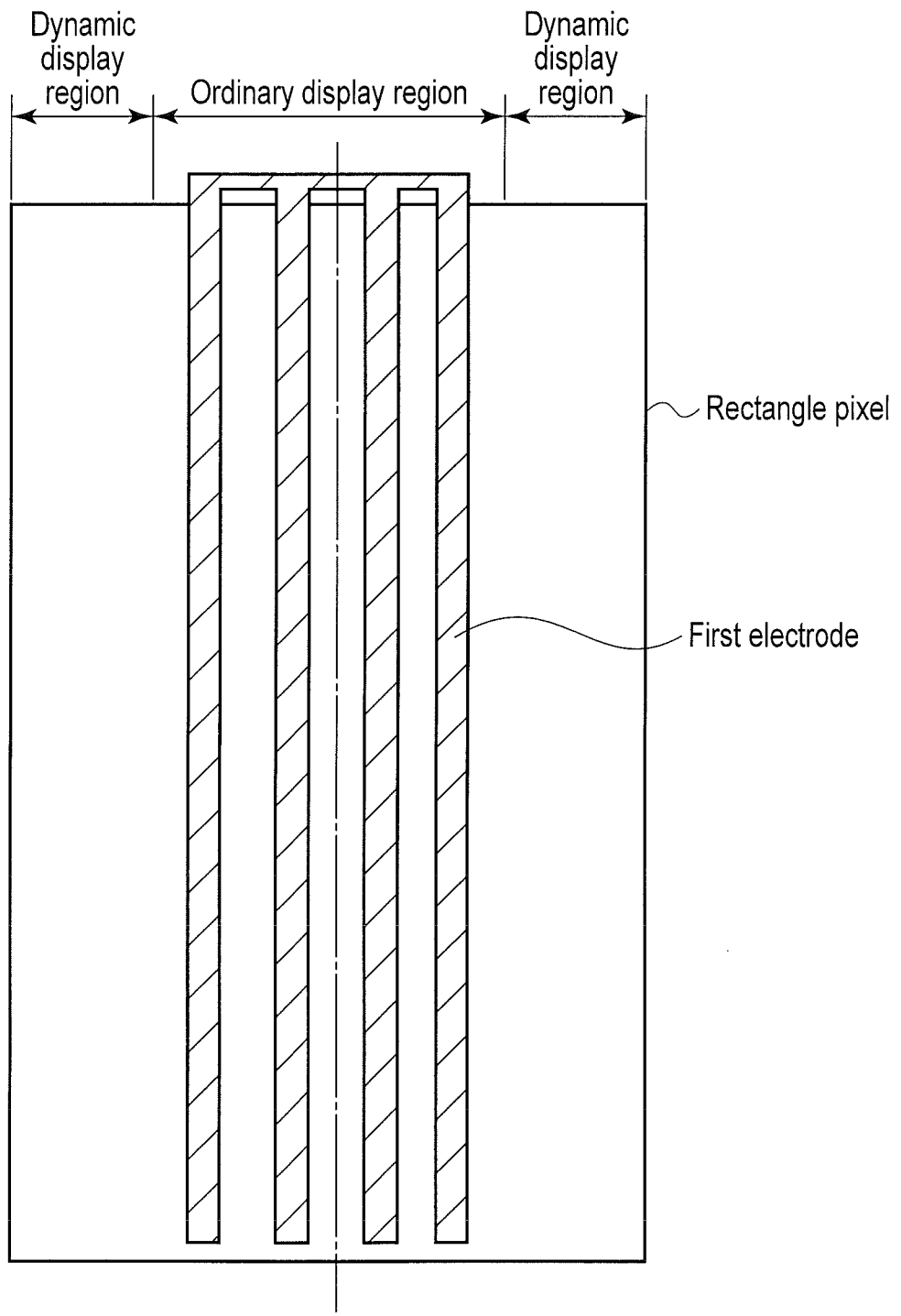
FIG. 9 is a plan view illustrating one pixel portion of the first electrode shown in FIG. 6.

Incidentally, the directions of projections of the second electrodes from an edge of the first electrode are preferably symmetric with respect to a point or a line of the center of the pixel, that is, are reverse to each other. Further, it is desirable that projections of the second electrodes trend toward the first transparent resin layer 4 or the protrusion 24. The combteeth shaped electrode may have a pattern of V-shape or oblique shape. Alternatively, the first and second electrodes may have a combteeth shaped pattern in which the direction of the combteeth are altered in one-fourth parts of the pixel at an angle of 5° to 45°. Thus, when the driving voltage is applied to the liquid crystal layer, motions of the liquid crystal molecules are classified into four motions that are symmetric with respect to a center point, and the display region of the pixel is divided into four display regions. In this case, the combteeth of the combteeth shaped electrodes can be inclined in the direction of 45° from the center line of the pixel. It is desirable that these electrode patterns are symmetric with respect to a point or a line of the center of the pixel. Number of the combteeth of the first and the second electrodes, a pitch between the combteeth, and a width of the combteeth can be properly selected. FIG. 9 shows an example of a pattern of the first electrode that is applicable to the present invention.

Incidentally, though a driving voltage is applied to the first electrode, the second electrode and the third electrode can be connected with common potential. The overlapped portion 29 of the first electrode and the second electrode shown in FIG. 6 can be used as an auxiliary capacitor.

The other examples of the patterns of the first electrode viewed from above are shown in FIGS. 9, 14, 15, and 16. In FIGS. 9, 14, 15, and 16, reference numeral 25 denotes an opening (polygonal shape of the colored pixel) of the black matrix 5, and reference numeral 9 denotes a tilt direction of the liquid crystal molecules. FIGS. 14 and 15 show two openings of the pixels having different tilt angles. When a driving voltage is applied to the first electrode 1, and the second electrode and the third electrode are connected with common potential, the liquid crystal molecules incline in the direction 9 in every half pixel. Further, In parallelogram pixels having different tilt angle shown in FIGS. 14 and 15, four different tilt direction of liquid crystal can be set, and thus providing a liquid crystal display device of wide viewing angle.

Number of the combteeth members of the first and the second electrodes in the width direction of the opening of the pixel, density of the combteeth shaped members, and a space of the combteeth shaped members can be properly selected depending on a size of the liquid crystal display device.

Further, in order to easily direct inclining of the liquid crystal molecules above the projected portion of the second electrode from the edge of the first electrode, it is possible to slope the edge of the first electrode, to increasing the thickness of the first electrode, and to etch the insulating layer on the second electrode to decrease the thickness thereof. Thus, since small pre-tilt angle of 0.1° to 1° is added to the liquid crystal molecules, it is possible to easily incline the liquid crystal molecules even at a low driving voltage, and to direct the inclining of the liquid crystal molecules. As a result, it is possible to improve a response property of the liquid crystal molecules in low gray scale.

Though, in the above description, the motion of the liquid crystal molecules of a negative dielectric anisotropy in an initial vertical alignment is explained, it is possible to employ liquid crystal molecules of a positive dielectric anisotropy in an initial horizontal alignment with the same advantage. Therefore, liquid crystal of a horizontal alignment type can be employed in the present invention. In the case of liquid crystal of an initial horizontal alignment type, liquid crystal molecules rise vertically with the substrate 10b on application of a driving voltage to transmit light. When the liquid crystal of an initial horizontal alignment type is employed, it is necessary to subject an alignment film to rubbing-treatment in order to definitely establish the alignment direction of the liquid crystal molecules.

Though the first and the second electrodes have combteeth shaped patterns as shown in FIGS. 6 and 7, they may have slit patterns. Also in the case of the slit pattern, the same advantage can be obtained by projecting the second electrode from the edge of the first electrode.

Next, transparent resin, pigment, and etc., which can be employed in the color filter substrate according to the embodiment described above will be exemplified as follows.

(Transparent Resin)

The photosensitive color composition employed in forming a light-shielding layer or coloring layer may contains polyfunctional monomer, photosensitive resin or non-photosensitive resin, photo-polymerization initiator, solvent, etc., in addition to pigment dispersion. Organic resins such as photosensitive resin and non-photosensitive resin, which have high transparency and can be employed in the embodiments of the present invention, are collectively called transparent resin.

As for specific examples of the transparent resin, they include thermoplastic resin, thermosetting resin and photosensitive resin. Examples of the thermoplastic resin include, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc. Examples of the thermosetting resin include, for example, epoxy resin, benzoguanamine resin, rosin-modified maleic resin, rosin-modified fumaric acid resin, melamine resin, urea resin, phenol resin, etc. It is also possible to employ, as thermosetting resin, compounds obtained through a reaction between melamine resin and a compound having isocyanate group.

(Alkali-Soluble Resin)

A photosensitive resin composition that can be patterned by photolithography is preferably used in forming a light-shielding layer, light-scattering layer, and cell-gap restricting layer in the embodiments described above. As the transparent resins contained in the photosensitive resin composition, resins having alkali-solubility are preferably used. As the alkali-soluble resin, any resins having carboxylic group or hydroxyl group may be preferably employed. As for specific examples of the alkali-soluble resin, they include epoxyacrylate resin, novolak resin, polyvinyl phenol resin, acrylic resin, carboxylic group-containing epoxy resin, and carboxylic group-containing urethane resin. Among these alkali-soluble resin, epoxyacrylate resin, novolak resin, and acrylic resin are preferable. In particular, epoxyacrylate resin and novolak resin are preferable.

(Acrylic Resin)

As for specific examples of the acrylic resin, they include following materials.

Acrylic resins include polymers obtained from the monomers, for example, (metha)acrylic acid; alkyl (metha)acrylate such as methyl (metha)acrylate, ethyl (metha)acrylate, propyl (metha)acrylate, butyl (metha)acrylate, t-butyl (metha)acrylate, benzyl (metha)acrylate, lauryl (metha)acrylate, etc.; hydroxyl group-containing (metha)acrylate such as hydroxyethyl (metha)acrylate, hydroxypropyl (metha)acrylate, etc.; ether group-containing (metha)acrylate such as ethoxyethyl (metha)acrylate, glycidyl (metha)acrylate, etc.; and alicyclic (metha)acrylate such as cyclohexyl (metha)acrylate, isobornyl (metha)acrylate, dicyclopentenyl (metha)acrylate, etc.

Incidentally, these monomers can be used singly or in combination of two or more kinds. Further, there may be used copolymers of these monomers and other kinds of compounds such as styrene, cyclohexyl maleimide, phenyl maleimide, etc., which can be co-polymerized with these monomers.

It is also possible to obtain photosensitive resins through the reaction of a copolymer of carboxylic acid having an ethylenic unsaturated group such as (metha)acrylic acid and a compound having epoxy group and unsaturated double bond such as glycidyl methacrylate, or through the addition of a carboxylic acid-containing compound such as (metha)acrylic acid to a polymer of epoxy group-containing (metha)acrylate such as glycidyl methacrylate or to a copolymer of epoxy group-containing (metha)acrylate with other kinds of (metha) acrylate.

It is also possible to obtain a photosensitive resin through the reaction between polymer having hydroxyl group and obtained by using a monomer such as hydroxyethyl methacrylate and a compound having an isocyanate group and an ethylenic unsaturated group such as methacryloyloxyethyl isocyanate.

Further, a resin having carboxylic group can be obtained through a reaction between a copolymer of hydroxyethyl methacrylate having a plurality of hydroxyl groups and a polybasic acid anhydride, thereby introducing carboxylic group into the copolymer. The manufacturing method thereof may not be limited to the above-described method.

As for specific examples of the acid anhydride to be employed in the aforementioned reaction, they include, for example, malonic anhydride, succinic anhydride, maleic anhydride, itaconic anhydride, phthalic anhydride, tetrahydrophthalic anhydride, hexahydrophthalic anhydride, methyltetrahydrophthalic anhydride, trimellitic anhydride, etc.

The acid value of solid content of above-described acrylic resin may preferably be confined to 20-180 mgKOH/g. If this acid value is less than 20 mgKOH/g, the developing rate of the photosensitive resin composition may become to slow, thereby taking a lot of time for executing the development thereof, thus leading to the decrease of productivity. On the other hand, if the acid value of solid content is larger than 180 mgKOH/g, the developing rate of the photosensitive resin composition may become to fast on the contrary, thereby inviting the generation of problems such as peeling of pattern after the development thereof or the chip-off of pattern.

Further, in the case where the aforementioned acrylic resin is photosensitive, the double-bond equivalent of the acrylic resin may preferably be not less than 100, more preferably 100-2000, most preferably 100-1000. If the double-bond equivalent thereof is higher than 2000, it may become difficult to secure sufficient photo-curing properties.

(Photopolymerizable Monomer)

As for specific examples of the photopolymerizable monomer, they include various kinds of acrylic esters and methacrylic esters such as 2-hydroxyethyl(metha)acrylate, 2-hydroxypropyl(metha)acrylate, cyclohexyl(metha)acrylate, polyethyleneglycol di(metha)acrylate, pentaerythritol tri (metha)acrylate, trimethylolpropane tri(metha)acrylate, dipentaerythritol hexa(metha)acrylate, tricyclodecanyl (metha)acrylate, melamine (metha)acrylate, epoxy(metha) acrylate; (metha)acrylic acid; styrene; vinyl acetate; (metha) acryl amide; N-hydroxymethyl (metha)acryl amide; acrylonitrile, etc.

Further, it is preferable to employ polyfunctional urethane acrylate having (metha)acryloyl group which can be obtained through the reaction between (metha)acrylate having hydroxyl group and polyfunctional isocyanate. Incidentally, the combination between the (metha)acrylate having hydroxyl group and polyfunctional isocyanate may be optionally selected and hence there is not any particular limitation. Further, only one kind of polyfunctional urethane acrylate may be used singly or polyfunctional urethane acrylate may be used in a combination of two or more kinds thereof.

(Photo-Polymerization Initiators)

As for specific examples of the photo-polymerization initiator, they include an acetophenone-based compound such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-benzyl-2-dimethylamino-1-(4-morpholinophenyl)-butan-1-one; a benzoin-based compound such as benzoin, benzoin methyl ether, benzoin ethyl ether, benzoin isopropyl ether, benzyldimethyl ketal, etc.; a benzophenone-based compound such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based compound such as thioxanthone, 2-chlorothioxanthone, 2-methylthioxanthone, isopropylthioxanthone, 2,4-diisopropylthioxanthone, etc.; a triazine-based compound such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; an oxime ester-based compound such as 1,2-octanedione, 1-[4-(phenylthio)-2-(O-benzyloxime)], O-(acetyl)-N-(1-phenyl-2-oxo-2-(4'-methoxynaphthyl)ethylidene)hydroxyl amine, etc.; a phosphine-based compound such as bis(2,4,6-trimethylbenzoyl)phenylphosphine oxide, 2,4,6-trimethylbenzoyl diphenylphosphine oxide, etc.; a quinine-based compound such as 9,10-phenanthrene quinine, camphor quinine, ethyl anthraquinone, etc.; a borate-based compound; a carbazol-based compound; an imidazole-based compound, a titanocene-based compound, etc. Oxime derivatives are suitable to increase sensitivity. These photo-polymerization initiators can be employed singly or in combination of two or more kinds thereof.

(Photo-Sensitizer)

It is preferable to use these photo-polymerization initiators in combination with a photo-sensitizer. Specific examples of the photo-sensitizer include α-acyloxy ester, acylphosphine oxide, methylphenyl glyoxylate, benzyl-9,10-phenanthrene quinone, camphor quinine, ethylanthraquinone, 4,4'-diethyl isophthalophenone, 3,3',4,4'-tetra(t-butyl peroxycarbonyl) benzophenone, 4,4'-diethyl aminobenzophenone, etc.

These sensitizers can be employed at a ratio of 0.1 to 60 parts by mass based on 100 parts by mass of the photo-polymerization initiator.

(Ethylenic Unsaturated Compound)

It is preferable to use these photo-polymerization initiators in combination with an ethylenic unsaturated compound. "Ethylenic unsaturated compound" means a compound having at least one ethylenic unsaturated bond in one molecule. In particular, it is preferable to use a compound having two ethylenic unsaturated bonds in one molecule in consideration of polymerizability, crosslinkability, and accompanying expandability of difference in solubility by developing solution between the exposed portion and unexposed portion. Further, it is preferable to use (metha)acrylate having an unsaturated bond originating from (metha)acryloyloxy group.

Compound having one ethylenic unsaturated bond in the molecule includes for example, unsaturated carboxylic acid such as (metha)acrylic acid, crotonic acid, isocrotonic acid, maleic acid, itaconic acid, citraconic acid, and alkyl ester thereof; (metha)acrylonitrile; (metha)acrylamide; stylene, etc. Compound having at least two ethylenic unsaturated bonds in the molecule includes for example, ester of unsaturated carboxylic acid and polyhydroxy compound, (metha) acryloyloxy-containing phosphate, urethane (metha)acrylate of (metha)acrylate compound and polyisocyanate compound, and epoxy(metha)acrylate of (metha)acrylic acid or hydroxy (metha)acrylate and polyepoxy compound.

Where a retardation layer is formed in a part of the color filter structure of the color filter substrate according to the present embodiment, the retardation layer is formed of a composition containing polymerizable liquid crystal compound, to which the above-described photo-polymerization initiator, sensitizer, photo-sensitizer and ethylenic unsaturated compound are added. Specific measures to give a function for altering retardation to the color filter include a coating method using polymer liquid crystal or cross-linkable polymer liquid crystal solution, a method of adding a birefringence-controlling agent to alkali-soluble transparent resin, and a method using polymerizable liquid crystal compound. As the polymerizable liquid crystal compound, discotheque polymerizable liquid crystal compound having a disc-shaped molecular structure or rod-shaped polymerizable liquid crystal compound can be used. It is possible to combine theses methods and materials described above.

(Polyfunctional Thiol)

The photosensitive resin composition may contain polyfunctional thiol which is capable of acting as a chain-transfer agent. The polyfunctional thiol is useful as long as it has two or more thiol groups. Specific examples of the polyfunctional thiol include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc.

These polyfunctional thiols can be employed singly or in combination of two or more kinds. The content of these polyfunctional thiols may preferably be confined to 0.2-150 parts by mass, more preferably 0.2-100 parts by mass based on 100 parts by mass of the pigment in the color composition.

(Storage Stabilizing Agent)

The photosensitive resin composition may further contain a storage-stabilizing agent for stabilizing the variation with time in viscosity of the composition. Specific examples of the storage stabilizing agent include, for example, quaternary ammonium chlorides such as benzyltrimethyl chloride, diethylhydroxy amine, etc.; organic acids such as lactic acid, oxalic acid, etc. and methyl ethers thereof; t-butyl pyrocatechol; organic phosphine such as triethyl phosphine, triphenyl phosphine, etc.; phosphite; etc. The storage stabilizing agent can be employed at a ratio of 0.1-10 parts by mass based on 100 parts by mass of the pigments in a coloring composition.

(Adherence Improver)

Further, the photosensitive resin composition may contain an adherence improver such as a silane coupling agent for the purpose of enhancing the adhesion thereof to a substrate. As for specific examples of the silane coupling agent, they include vinyl silanes such as vinyl tris(β-methoxyethoxy) silane, vinylethoxy silane, vinyltrimethoxy silane, etc.; (metha)acrylsilanes such as γ-methacryloxypropyltrimethoxy silane, etc.; epoxy silanes such as β-(3,4-epoxycyclohexyl)ethyltrimethoxy silane, β-(3,4-epoxycyclohexyl) methyltrimethoxy silane, β-(3,4-epoxycyclohexyl) ethyltriethoxy silane, β-(3,4-epoxycyclohexyl) methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β (aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc. These silane coupling agents can be used at a ratio of 0.01-10 parts by mass based on 100 parts by mass of the pigments in a coloring composition.

(Solvents)

The photosensitive resin composition may further contain a solvent such as water, organic solvents, etc. so that the surface of a substrate is uniformly coated therewith. Further, in the case where the photosensitive resin composition of the present invention is to be used for constituting the color layer of color filter, the solvent acts to enable pigments to be uniformly dispersed in the color layer. Specific examples of the solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds. The mixing ratio of these solvents may be confined to the range of 800 to 4000 parts by mass, preferably 1000 to 2500 parts by mass based on 100 parts by mass of the pigments in the color composition.

(Pigments)

Examples of a red pigment include C.I. Pigment Red 7, 14, 41, 48:2, 48:3, 48:4, 81:1, 81:2, 81:3, 81:4, 97, 122, 123, 146, 149, 168, 177, 178, 179, 184, 185, 187, 192, 200, 202, 208, 210, 215, 216, 217, 220, 223, 224, 226, 227, 228, 240, 242, 246, 254, 255, 264, 270, 272, 279, etc.

Examples of the yellow pigment include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 126, 127, 128, 129, 137, 138, 147, 148, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213, 214, etc.

Examples of the blue pigment include C.I. Pigment Blue 15, 15:1, 15:2, 15:3, 15:4, 15:6, 16, 22, 60, 64, 80, etc. Among these blue pigments, C.I. Pigment Blue 15:6 is preferred.

Examples of the violet pigment include C.I. Pigment Violet 1, 19, 23, 27, 29, 30, 32, 37, 40, 42, 50, etc. Among these violet pigments, C.I. Pigment Violet 23 is preferred.

Examples of the green pigment include C.I. Pigment Green 1, 2, 4, 7, 8, 10, 13, 14, 15, 17, 18, 19, 26, 36, 45, 48, 50, 51, 54, 55, etc. Among these green pigments, C.I. Pigment Green 58 is preferred.

Pigment Blue, Pigment Violet, Pigment Red, Pigment Yellow, and Pigment Green may be abbreviated to PB, PV, PR, PY, and PG, respectively in the following description.

(Colorant of Light-Shielding Layer)

Light-shielding colorants contained in a light-shielding layer or black matrix exhibit a light-shielding function as they have absorbance in visible light range. In the present embodiment, the light-shielding colorants include organic pigments, inorganic pigments, dyes, etc. As for the inorganic pigments, it is possible to employ carbon black, titan dioxide, etc. As for the dyes, it is possible to employ azo dye, anthoraquinone dye, phthalicyanine dye, quinoneimine dye, quinoline dye, nitro dye, carbonyl dye, methane dye, etc. As for the organic pigments, it is possible to employ the organic pigments described above. These light-shielding colorants can be employed singly or in combination of two or more kinds thereof in any combination and any mixing ratio. Further, it is possible to elevate the volume resistance of the colorant by coating colorant particle with a resin, or to lower the volume resistance of the colorant by increasing the content of the colorant to give some conductivity to the colorant. Since the volume resistance of the colorant ranges between $10^8$ and $10^{15}$ Ωcm, the resistance of a transparent conductive layer are not affected by the volume resistance of the colorant. Similarly, it is possible to control a dielectric constant of the light-shielding layer in a rage of about 3 to 11 by means of selection of the colorant or adjustment of the content of the colorant. The dielectric constants of the light-shielding layer, first transparent resin layer, and color layer can be adjust according to a design condition of a liquid crystal display device and driving condition of liquid crystal.

(Dispersant, Dispersing Agent)

It is preferable to employ a polymer dispersant as a dispersant to dispersing the pigment since it has good dispersion stability with time. The polymer dispersant includes polyurethane based dispersant, polyethyleneimine based dispersant, polyoxyethylene alkylether based dispersant, polyoxyethyleneglycol diester based dispersant, sorbitan aliphatic ester based dispersant, aliphatic modified polyester ester based dispersant, etc. Among these dispersant, graft polymer based dispersant containing nitrogen atom is preferable for the light-shielding photosensitive resin composition containing large amount of pigment used in the present embodiment because of excellent developing property.

As specific examples of these dispersant, they include EFKA (manufactured by FK chemicals BV co.), Disperbic (manufactured by Bickchemie co.), Didperon (manufactured by Kusumotokasei co.), SOLSPERSE (manufactured by the Lubrizol. Corporation), KP (manufactured by Shin-Etsu Chemical Co., Ltd.), Polyferro (manufactured by Kyoeisha Chemical Co., Ltd.), etc. These dispersants may be employed individually or in combination of two or more kinds.

It is possible to employ colorant derivatives as a dispersing agent. Specific examples of the colorant derivatives include azo based derivatives, phthalocyanine based derivatives, quinacridone based derivatives, benzimidazoline based derivatives, quinophthalone based derivatives, isoindolinone based derivatives, dioxazin based derivatives, anthraquinone based derivatives, indanthrene based derivatives, perylene based derivatives, perinone based derivatives, diketopyroropyrrole based derivatives, etc. Among these colorant derivatives, quinophthalone based derivatives are preferable.

Substituent of the colorant derivative includes, for example, sulfonic group, sulfonamide group, quaternary salt of sulfonamide group, phthalimidemethyl group, dialkylaminoalkyl group, hydroxy group, carboxyl group, amide group, etc. The substituent is bonded with the pigment skeleton directly or through alkyl group, aryl group, or heterocyclic group. Among these substituents, the sulfonic group is preferable. A plurality of substituents are substituted and bonded to the pigment skeleton.

Specific examples of colorant derivatives includes sulfonic acid derivative of phthalocyamine, sulfonic acid derivative of quinophthalone, sulfonic acid derivative of anthraquinone, sulfonic acid derivative of quinacridone, sulfonic acid derivative of diketopyroropyrrole, sulfonic acid derivative of dioxazine, etc.

These dispersing agent and colorant derivatives may be employed individually or in combination of any two or more kinds in any ratio.

Various examples are explained below.

Example 1

A color filter substrate 11 shown in FIG. 10 was manufactured as described below.

[Forming of Transparent Conductive Film]

By means of a sputtering apparatus, the surface of a transparent substrate 10a formed of non-alkali glass was coated with a transparent conductive film 3 (third electrode) formed of indium tin oxide (ITO) thin film and having a thickness of 0.14 µm.

[Forming of Black Matrix]

(Dispersion for Forming Black Matrix)

20 mass parts of carbon pigment #47 (manufactured by Mitsubishi Chemical Co., Ltd.), 8.3 mass parts of polymer dispersant BYK-182 (manufactured by Bick Chemee Co., Ltd.), 1.0 mass part of copper phthalocyanine derivatives (manufactured by Toyo Ink Seizo Co., Ltd.), and 71 mass parts of propylene glycol monomethyl ether were agitated by means of a beads mill dispersing machine to prepare a carbon black dispersion.

(Photoresist for Forming Black Matrix)

A photoresist for forming a black matrix was produced using the following materials.

Carbon black dispersion: pigment #47 (produced by Mitsubishi Chemical Co., Ltd.)

Transparent resin: V259-ME (produced by Shinnittetsukagaku Co., Ltd. Solid content of 56.1 mass %)

Photopolymerizable monomer: DPHA (produced by Nippon Kayaku Co., Ltd.)

Photopolymerization initiator: OXE-02 (produced by Ciba Specialty Chemicals Co., Ltd.)
: OXE-01 (produced by Ciba Specialty Chemicals Co., Ltd.)
Solvent: Propylene glycol monomethyl ether acetate
:Ethyl-3-ethoxypropionate
Leveling agent: BYK-330 (Big Chemie Co., Ltd.)

Above materials are mixed and agitated in the following composition to obtain a photoresist for forming a black matrix (concentration of pigment in solid matter: about 20%).

| Carbon black dispersion | 3.0 part by mass |
|---|---|
| Transparent resin | 1.4 part by mass |
| Photopolymerizable monomer | 0.4 part by mass |
| Photopolymerization initiator OXE-01 | 0.67 part by mass |
| Photopolymerization initiator OXE-02 | 0.17 part by mass |
| Propylene glycol monomethyl ether acetate | 14.0 part by mass |
| Ethyl-3-ethoxypropionate | 5.0 part by mass |
| Leveling agent | 1.5 part by mass |

(Forming Condition of a Black Matrix)

The transparent conductive film 3 was spin-coated with photoresist to form a photoresist film having a thickness of 1.5 µm. After the photoresist film was dried for 30 minutes at a temperature of 100° C., it was exposed to light from a light source of an ultra-high pressure mercury lamp at a dose of 200 mJ/cm$^2$ through a photomask for exposure with a pattern width (line width of black matrix) of 24.5 µm.

Next, the photoresist film was developed with a 2.5% aqueous solution of sodium carbonate for 60 minutes, after which the resultant substrate was washed with water and dried. Further, the resultant substrate was post-baked for 30 minutes at a temperature of 230° C. to fix the pattern, thereby forming a black matrix 5 on the transparent conductive film 3. The black matrix 5 had a line width of about 24 µm, and was formed around the pixel (on the four sides of the pixel). The tilting angle of the edge of the black matrix on the surface of the transparent conductive film was about 45 degree.

[Forming of a First Transparent Resin Layer]

(Synthesis of Resin A)

686 parts by mass of propylene glycol monomethyl ether acetate, 332 parts by mass of glycidyl methacrylate, and 6.6 parts by mass of azobisisobutyronitrile were introduced into a separable flask, and heated for 6 hours at a temperature of 80° C. in an atmosphere of nitrogen to obtain a resin solution.

Subsequently, 168 parts by mass of acrylic acid, 0.05 parts by mass of methoquinone, and 0.5 parts by mass of triphenyl phosphine were added to the obtained resin solution and heated for 24 hours at a temperature of 100° C. during blowing air to obtain an acrylic acid addition resin solution.

Further, tetrahydrophthalic acid was added to the obtained acrylic acid addition resin solution and heated for 10 hours at a temperature of 70° C. to obtain resin A solution.

(Preparation of Photosensitive Resin Solution A)

A negative type photosensitive resin solution A is prepared in the following composition.

| Resin A | 200 parts by mass |
|---|---|
| Photopolymerizable monomer Dipentaerythritol hexaacrylte | 20 parts by mass |
| Photo-polymerization initiator (Ciba Specialities Chemicals Irgacur 907) | 10 parts by mass |
| Solvent Propyleneglycol monomethylether acetate | 270 parts by mass |

A first transparent resin layer 4 was formed at the position covering two sides of the black matrix in the longitudinal direction thereof using the above-described photosensitive resin solution A by means of photolithography using a photomask having a pattern (opening) of the first transparent resin layer 4. Height (thickness) of the first transparent resin layer 4 was 1.5 µm. In the present embodiment, the first transparent resin layer 4 was formed in the longitudinal direction of the pixel at the position covering two sides of the black matrix. The first transparent resin layer 4 was not formed in the crosswise direction of the pixel and in the ordinary display region.

[Forming of Color Pixel]

<<Dispersion for Forming Color Layer>>

Following pigments were used as organic pigments to be dispersed in the color layer.

Red pigment: C.I. Pigment Red 254 (Irgarfor Red B-CF; Chiba Speciality Chemicals Co., Ltd), C.I. Pigment Red 177 (Chromophthal Red A2B; Ciba Speciality Chemicals Co., Ltd.)

Green pigment: C.I. Pigment Green 58 (DIC Co., Ltd.), C.I. Pigment Yellow 150 (Fanchion Fast Yellow Y-5688; Bayer Co., Ltd.)

Blue pigment: C.I. Pigment Blue 15 (Lionol Blue ES; Toyo Ink Manufacturing Co., Ltd.), C.I. Pigment Violet 23 (Paliogen Violet 5890; BASF Co., Ltd.)

Color dispersions of red, green and blue were prepared by using the above pigments.

| <Red dispersion> | |
|---|---|
| Red pigment: C.I. Pigment Red 254 | 18 parts by mass |
| Red pigment: C.I. Pigment Red 177 | 2 parts by mass |
| Acrylic varnish (solid matter, 20% by mass) | 108 parts by mass |

A mixture having the above composition was uniformly stirred and then, by making use of glass beads, the mixture was dispersed in a sand mill for five hours and then subjected to filtering using a 5 µm filter to prepare red pigment dispersion.

| <Green dispersion> | |
|---|---|
| Green pigment: C.I. Pigment Green 58 | 16 parts by mass |
| Yellow pigment: C.I. Pigment Yellow 150 | 8 parts by mass |
| Acrylic varnish (solid matter, 20% by mass) | 102 parts by mass |

A green pigment dispersion was prepared in the same manner as employed in the manufacture of the red pigment dispersion.

| <Blue dispersion> | |
|---|---|
| Blue pigment: C.I. Pigment Blue 15 | 50 parts by mass |
| Violet pigment: C.I. Pigment Violet 23 | 2 parts by mass |
| Dispersant (Solsverse 20000; Zenega Co., Ltd.) | 6 parts by mass |
| Acrylic varnish (solid matter, 20% by mass) | 200 parts by mass |

A blue pigment dispersion was prepared in the same manner as employed in the manufacture of the red pigment dispersion.

<<Forming of Color Pixel>>

Color layers were formed using color resists having compositions shown in the following Table 1.

TABLE 1

| Color Resist | Red Pixel | Green Pixel | Blue Pixel |
| --- | --- | --- | --- |
| Pigment Dispersion (Part by mass) | Red Dispersion 42.5 | Green Dispersion 43.5 | Blue Dispersion 35 |
| Acrylic resin solution | 6.7 | 5.7 | 14.2 |
| Monomer | 4.0 | 4.8 | 5.6 |
| Photopolymerization Initiator | 3.4 | 2.8 | 2.0 |
| Sensitizer | 0.4 | 0.2 | 0.2 |
| Organic Solvent | 43.0 | 43.0 | 43.0 |
| Total | 100 | 100 | 100 |

Figure 10A:
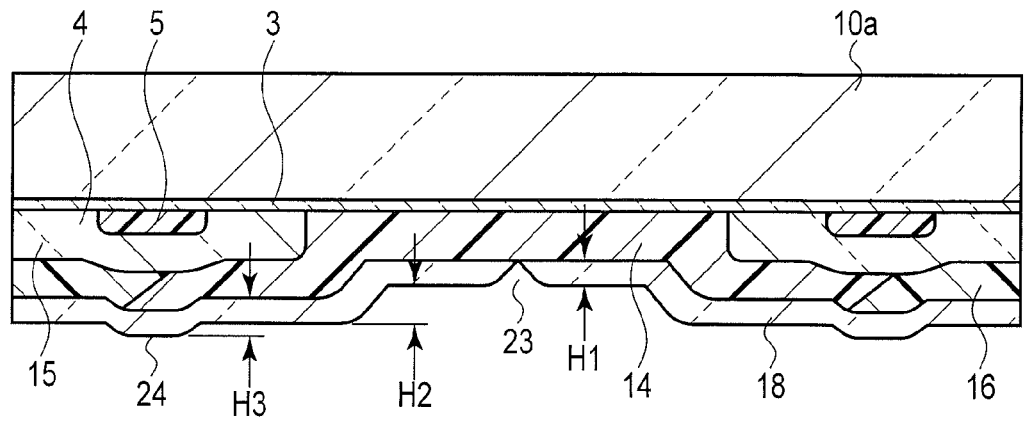
FIG. 10A is a sectional view illustrating a part of the color filter substrate according to Example 1.

First of all, the surface of a glass substrate 10a having a transparent conductive film 3, black matrix 5, and first transparent resin layer 4 was coated with the red color resist for forming the red pixel, as shown in FIG. 10A, by means of spin coating to obtain a film having a thickness of 2.5 μm. After the film was dried for 5 minutes at a temperature of 90° C., the film was exposed to light from a high-pressure mercury vapor lamp at a dose of 300 mJ/cm$^2$ through a photomask for forming color pixels. And then, the film was subjected to a developing treatment for 60 seconds by making use of an alkaline developing solution, thus forming a stripe-shaped red color pixel 15 on the pixel region so as to covering the fist transparent resin layer 4. Thereafter, the resultant structure was baked for 30 minutes at a temperature of 230° C.

Next, a coating film of the green color resist for forming the green pixel was formed by means of spin coating with a thickness of 2.5 μm so as to covering the fist transparent resin layer 4 in the same manner as employed in the forming of the red pixel. After the film was dried for 5 minutes at a temperature of 90° C., the film was subjected to a pattern exposure through a photomask and to a developing treatment so as to form a pattern at a position adjacent to the red pixel, thus forming a green color pixel 14. Incidentally, a color filter substrate is manufactured by well-known photolithography, including the present Example, The color filter substrate shown in FIG. 10A is processed on the surface of a color filter in a manufacturing process.

A coating film of the blue color resist for forming the blue pixel was formed with a thickness of 2.5 μm, and a blue color pixel 14 was formed at a position adjacent to the red and green pixels in the same manner as employed in the forming of the red and green pixels. As a result, a color filter consisting of red, green and glue pixels was formed on the substrate 10a. Subsequently, the color filter was subjected to heat treatment 30 minutes at a temperature of 230° C. to cure it.

[Forming of Second Transparent Resin Layer]

(Synthesis of resin B)

800 parts by mass of cyclohexanone was introduced into a reaction vessel, and was heated during introducing nitrogen gas, and the following mixture of monomer and heat-polymerization initiator was added dropwise to the reaction vessel to cause polymerization reaction.

| | |
| --- | --- |
| Styrene | 60 parts by mass |
| Methacrylic acid | 60 parts by mass |
| Methyl methacrylate | 65 parts by mass |
| Butyl methacrylate | 65 parts by mass |
| Thermalpolymerization initiator | 10 parts by mass |
| Chain transfer agent | 3 parts by mass |

After dropping and sufficient heating, a solution of 2.0 parts by mass of the heat-polymerization initiator dissolved in 50 parts by mass of cyclohexanone was added to the reacted product and reaction was continued, to obtain a resin solution. Cyclohexanone was added to the resin solution so as to obtain solid matter content of 20% by weight, thus preparing an acrylic resin solution of resin B. This acrylic resin had weight average molecular weight of 10,000.

(Coating Resin Solution B)

A mixture of the following composition was uniformly stirred and mixed together to obtain a mixture. Then, by making use of glass beads, the mixture was dispersed in a sand mill for five hours and then subjected to filtering using a 5 μm filter to prepare a coating resin solution B.

| | |
| --- | --- |
| Resin B | 150 parts by mass |
| Polyfunctional polymerizable monomer ("Aronix M-400"; Toa Gosei Co., Ltd.) | 20 parts by mass |
| Photo-polymerization initiator (Ciba Specialities Chemicals Irgacur 907) | 16 parts by mass |
| Cyclohexanone | 214 parts by mass |

A second transparent resin layer having a thickness of 0.6 μm was formed so as to cover the entire surface of the color layer using the above described coating resin solution B to obtain a color filter substrate.

Figure 10B:
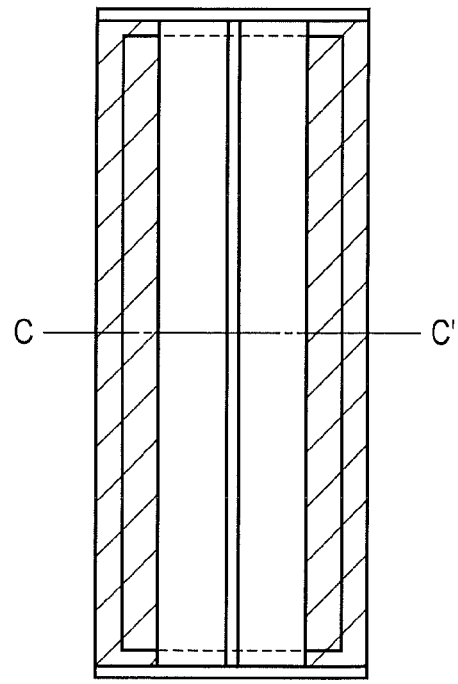
FIG. 10B is a plan view illustrating a part of the color filter substrate according to Example 1.

As shown in FIG. 10A, the depth H1 of the depression 23 formed in the second transparent resin layer was set to 0.6 μm. Level difference H2 between the ordinary display region and the dynamic display region was set to 1 μm. The height H3 of the projection 24, which was the laminated structure of the first transparent resin layer 4, the color layer and the second transparent resin layer 18, was set to 0.5 μm. The height H3 of the projection 24 was the level difference between the surface of the second transparent resin layer 18 and the top of the laminated structure in the dynamic display region. FIG. 10B is a plan view showing the green pixel of the color filter according to the present Example. FIG. 10A corresponds to a sectional view cut by line C-C' of FIG. 10B. In FIG. 10B, a region of oblique lines denotes the first transparent resin layer 4.

Example 2

Figure 11A:
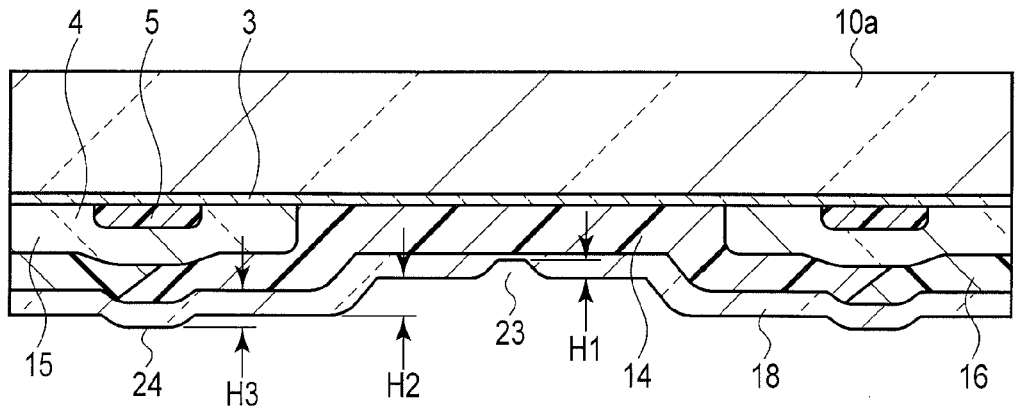
FIG. 11A is a sectional view illustrating a part of the color filter substrate according to Example 2.
Figure 11B:
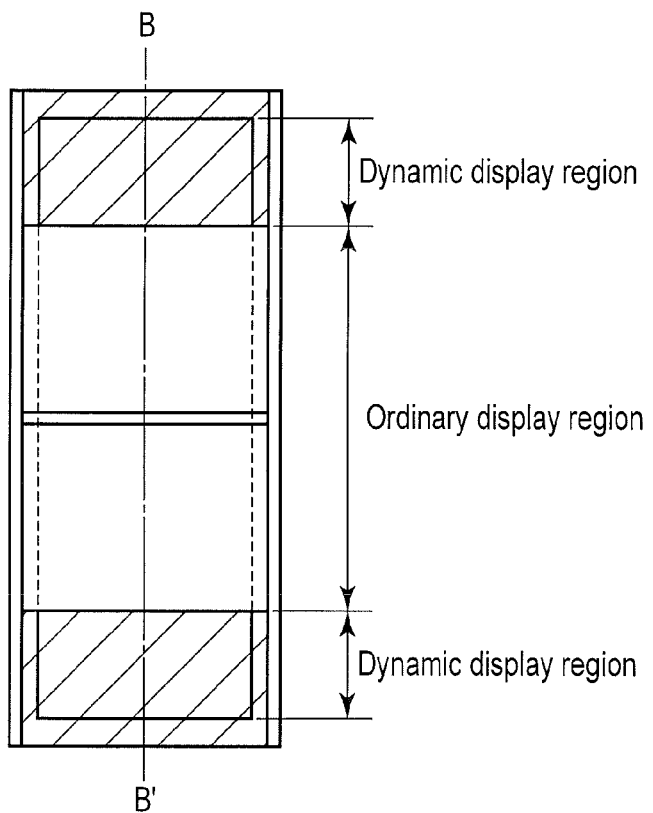
FIG. 11B is a plan view illustrating a part of the color filter substrate according to Example 2.
Figure 13:
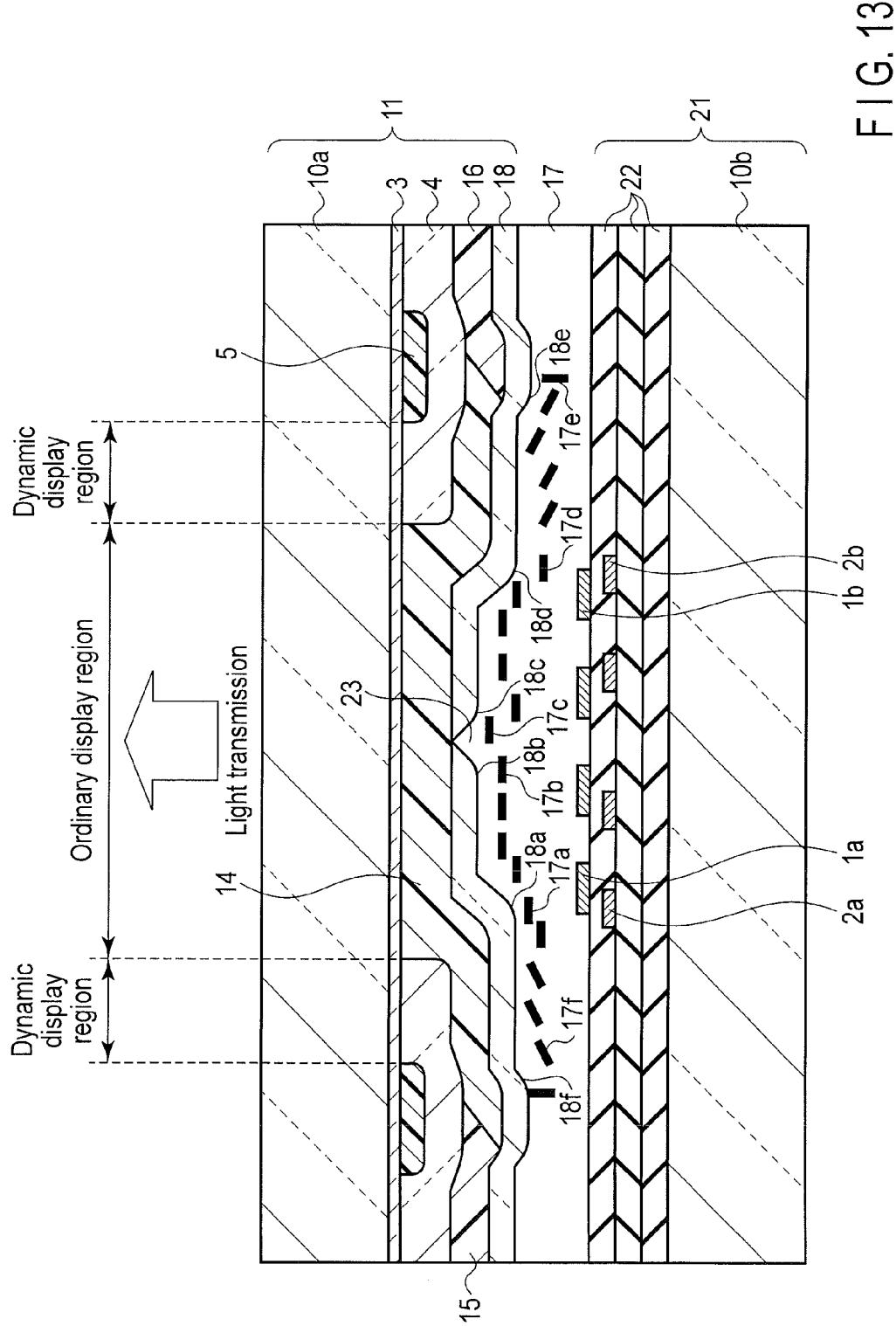
FIG. 13 is a view explaining an embodiment in which two TFT elements are arranged in one pixel, and a luminosity of dynamic display is adjusted independently for each TFT element.

The color filter substrate shown in FIG. 11 was produced as follows:

Materials and process for using in production of the color filter substrate were the same as that used in Example 1. In the Example 2, a pattern of the first transparent resin layer 4 was formed in the crosswise direction of the pixel, that is, at a position of two sides of the black matrix, unlike Example 1, as shown in FIG. 11. FIG. 11A corresponds to a sectional view cut by line B-B' of FIG. 11B. In FIG. 11B, a region of oblique lines denotes the first transparent resin layer 4.

As shown in FIG. 11A, the depth H1 of the depression 23 formed in the second transparent resin layer was set to 0.5 μm. Level difference H2 between the ordinary display region and the dynamic display region was set to 1 μm. The height H3 of the projection 24, which was the laminated structure of the first transparent resin layer 4, the color layer and the second transparent resin layer 18, was set to 0.5 μm. The height H3 of the projection 24 was the level difference between the surface of the second transparent resin layer 18 and the top of the laminated structure in the dynamic display region.

Where the color filter substrate of the present example was applied to a liquid crystal display device, first and the second electrodes can be formed into a combteeth shaped pattern arranged in parallel with the first transparent resin layer formed in the crosswise direction of the pixel. The protruding direction of the second electrode can be the direction toward the first transparent resin layer in the same manner as Example 1.

Example 3

As shown in FIG. 1, the color filter substrate 11 of Example 1 and the array substrate 21 having active elements of TFT were bonded to one another with liquid crystal of negative electric anisotropy filled therebetween. Polarizers were arranged on the both surfaces of the bonded structure to provide a liquid crystal display device. The surfaces of the color filter substrate and the array substrate are coated with vertical-alignment films in advance. The array substrate 21 provided with active elements has combteeth shaped electrodes as shown in FIGS. 6 and 9.

The vertical-alignment films are omitted in the figures. A strict alignment treatment (e.g. tilting angle of 89°, and alignment treatments in a plurality of directions to form a plurality of domains), which was necessary for a vertical-alignment type liquid crystal display device such as MVA and VATN, was not performed, and vertical-alignment treatment of 90° was performed.

There will be explained the liquid crystal display device manufactured above with reference to FIG. 1. An action of liquid crystal 17 is explained regarding the green pixel 14 in the center of FIG. 1 as a representative of pixels.

The liquid crystal molecules of liquid crystal of vertical initial alignment type incline in the direction toward the first transparent resin layer 4 from the center of the green pixel 14, that is, in the direction of an arrow A by means of the first and second electrodes 1, 2 to which a driving voltage is applied. The second electrode 2 protrudes from the edge of the first electrode 1 in the direction of the arrow A. The third electrode 3 and the second electrode 2 are at the same potential.

Example 4

A liquid crystal display device of the present example is shown in FIG. 12. This example relates to a transflective type liquid crystal display device. A reflective polarizer disclosed in JP. 4177398 can be employed as a polarizer.

A color filter substrate 61 employed in the present example is, for example, the color filter substrate of the Example 1 shown in FIG. 6. The array substrate 71 provided with active elements has combteeth shaped electrodes as described in Example 4.

The color filter substrate 61 and the array substrate 71 are bonded to one another with liquid crystal 77 filled therebetween. An optical compensator 81*a* and polarizer 82*a* are arranged on that side of the color filter substrate 61 which is opposite to liquid crystal 77. A polarizer 82*b*, optical diffusion layer 83*a*, reflective polarizer 84, optical compensator 81*b*, prism sheet 85, optical diffusion layer 83*b*, light guide plate 86, and optical reflective plate 87 are arranged on that side of the array substrate 71 which is opposite to liquid crystal 77. The light guide plate 86 is connected to a light source, for example, LED light source 88.

Discrete light emitting elements of R, G, B are preferably employed as the LED light source 88. However, a pseudo white LED may be employed as the LED light source 88. Conventional cold cathode fluorescent tube or fluorescent lamp may be employed instead of the LED. Where the discrete light emitting elements of R, G, B are employed as the LED light source 88, it is possible to perform an optimum color display since emission strength can be adjusted about individual colors. Further, the back light can be applied to a stereoscopic image display. The technique of local deming, which improves a contrast by adjusting a brightness of a back light on the display screen, is easily applied to a LED light source, whereby a slight light leak, which easily causes at the step between the ordinary display region and the dynamic display region, can be inconspicuous.

According to the liquid crystal display device of the present embodiments, it is possible to alleviate the alignment treatment of the color filter substrate and array substrate, and to improve the responsibility of liquid crystal. Further, since the structure of the liquid crystal display device has the protrusion 24, recess 23, first electrode (pixel electrode), and second electrode, it is possible to alleviate disclination of liquid crystal and to improve liquid crystal display.

Furthermore, since the transparent conductive film can be formed so as to cover the effective display region of the color filter, it is possible to provide the liquid crystal display device which is hardly influenced by outer electric field, unlike the liquid crystal display device of IPS system (liquid crystal is operated by transversal electric field) and FFS system (liquid crystal is operated by electric field generated at fringe of a combteeth shaped electrode).

Incidentally, the pixels of the present embodiments can be divided into two ½ pixels or four ¼ pixels point-symmetrically or line-symmetrically with regard to a center of the pixel region. Where two or four TFT elements are provided in each pixel and different voltages are applied to the TFT elements, it is possible to adjust view angle and to display a three dimensional image.

For example, by a higher operating voltage is applied between the first electrode and the second electrode, it is possible to stress a brightness of dynamic display.

Further, where two TFT elements are provided in each pixel and an operating voltage is applied between the first electrode and the second electrode near the dynamic display region from one TFT element, it is possible to adjust independently a brightness of dynamic display.

What is claimed is:

1. A color filter substrate for a liquid crystal display device performing an ordinary display for a gray scale display and a dynamic display for a bright display, which comprises:
   a transparent substrate;
   a transparent conductive film formed above the transparent substrate;
   a black matrix formed above the transparent conductive film and having a pixel region which is an opening partitioned into a polygonal pixel shape having two parallel sides;
   a first transparent resin layer formed so as to cover portions corresponding to the two parallel sides of the black matrix;
   a color layer formed for the pixel region and partitioned into an ordinary display region formed directly above the transparent conductive film at a center of the pixel region, and a dynamic display region formed above the first transparent resin layer; and
   a second transparent resin layer formed above the color layer and having a linear depression passing a center of the pixel region, wherein
   a thickness A of the first transparent resin layer between a surface of the transparent conductive film formed above the transparent substrate and a bottom of the linear depression, a total thickness B of the color layer and the second transparent resin layer in the ordinary display region, and a total thickness C of the first transparent resin layer, the color layer and the second transparent resin layer in the dynamic display region satisfy a relationship of A<B<C, and a total thickness from the black matrix to the second transparent resin layer above the black matrix is larger than the thickness C in the dynamic display region.

2. A liquid crystal display device comprising:
the color filter substrate recited in claim 1.

3. The liquid crystal display device according to claim 2, wherein the liquid crystal display device further comprises
an array substrate arranged to oppose to the color filter substrate and provided with elements for driving liquid crystal, said elements being arranged in a matrix form; and
a liquid crystal layer interposed between the color filter substrate and the array substrate, and
wherein the array substrate comprises a first electrode and a second electrode to which different voltages are applied in order to drive liquid crystal.

4. The liquid crystal display device according to claim 3, wherein liquid crystal molecules in two regions formed by symmetrically dividing the pixel region with a straight line act to tilt to opposite directions to each other when an operating voltage is applied between the first electrode, the second electrode and the transparent conductive film acting as a third electrode.

5. The liquid crystal display device according to claim 3, wherein the pixel region is point-symmetrically divided into four operating regions with regard to a center of the pixel region in a plane view when the liquid crystal molecules act depending on a driving voltage applied thereto.

6. The liquid crystal display device according to claim 3, wherein the first electrode has a combteeth shaped pattern and connected to active elements driving liquid crystal, the second electrode has a combteeth shaped pattern and arranged beneath the first electrode with an insulating layer interposed therebetween, and the second electrode protrudes from an edge of the first electrode toward a side of a pixel in a plane view.

7. The liquid crystal display device according to claim 3, wherein the first and second electrodes are made of conductive metal oxide which is transparent in a visible light range.

8. A liquid crystal display device which comprises:
a color filter substrate including a transparent substrate, a transparent conductive film formed above the transparent substrate, a black matrix having pixel regions which are openings partitioned into polygonal pixel shapes respectively having two parallel sides, a first transparent resin layer, and color pixels formed of a plurality of color layers formed above the pixel regions;
an array substrate arranged to oppose to the color filter substrate and provided with elements for driving liquid crystal, said elements being arranged in a matrix form; and
a liquid crystal layer interposed between the color filter substrate and the array substrate,
wherein the first transparent resin layer and color layer overlap along the black matrix in the pixel region, the array substrate includes a first electrode and a second electrode, which are of combteeth shape, made of conductive metal oxide, and are transparent in visible light range, the second electrode is arranged beneath the first electrode with an insulating layer interposed therebetween, the second electrode protrudes from an edge of the first electrode toward the first transparent resin layer in a plane view, and the first electrode is not arranged in a position above the array substrate which the first transparent resin layer is arranged in the plane view.

9. The liquid crystal display device according to claim 8, wherein the liquid crystal has a negative dielectric anisotropy.

* * * * *